(12) United States Patent
Fleischer et al.

(10) Patent No.: US 7,765,029 B2
(45) Date of Patent: Jul. 27, 2010

(54) HYBRID CONTROL DEVICE

(75) Inventors: Jason G. Fleischer, Del Mar, CA (US);
Botond Szatmary, Del Mar, CA (US);
Donald B. Hutson, San Diego, CA (US); Douglas A. Moore, San Diego, CA (US); James A. Snook, San Diego, CA (US); Gerald M. Edelman, La Jolla, CA (US); Jeffrey L. Krichmar, Cardiff-by-the-Sea, CA (US)

(73) Assignee: Neurosciences Research Foundation, Inc., San Diego, CA (US)

( * ) Notice: Subject to any disclaimer, the term of this patent is extended or adjusted under 35 U.S.C. 154(b) by 615 days.

(21) Appl. No.: 11/530,685

(22) Filed: Sep. 11, 2006

(65) Prior Publication Data
US 2007/0100780 A1     May 3, 2007

Related U.S. Application Data

(60) Provisional application No. 60/716,821, filed on Sep. 13, 2005.

(51) Int. Cl.
*G06N 3/02* (2006.01)
*G05B 13/00* (2006.01)
*G06F 19/00* (2006.01)
*G06E 1/00* (2006.01)

(52) U.S. Cl. ............... 700/250; 700/48; 700/61; 700/249; 700/255; 700/259; 706/14; 706/15; 706/16; 706/20

(58) Field of Classification Search ............ 382/158; 700/48, 245–264; 706/1, 3, 6, 7, 10, 12, 706/14, 15–44, 31, 34
See application file for complete search history.

(56) References Cited

U.S. PATENT DOCUMENTS

| 4,095,367 | A |   | 6/1978  | Ogawa             |         |
|-----------|---|---|---------|-------------------|---------|
| 4,884,216 | A | * | 11/1989 | Kuperstein        | 700/259 |
| 5,048,097 | A | * | 9/1991  | Gaborski et al.   | 382/156 |
| 5,164,826 | A |   | 11/1992 | Dailey            |         |
| 5,680,515 | A |   | 10/1997 | Barhen et al.     |         |

(Continued)

FOREIGN PATENT DOCUMENTS

EP     1089221     4/2004

(Continued)

OTHER PUBLICATIONS

PCT International Search Report for Application No. PCT/US06/25107 dated Mar. 19, 2007, 6 pages.

(Continued)

*Primary Examiner*—Khoi Tran
*Assistant Examiner*—Dale Moyer
(74) *Attorney, Agent, or Firm*—Fliesler Meyer LLP

(57) ABSTRACT

A brain-based device (BBD) for moving in a real-world environment has sensors that provide data about the environment, actuators to move the BBD, and a hybrid controller which includes a neural controller having a simulated nervous system being a model of selected areas of the human brain and a non-neural controller based on a computational algorithmic network. The neural controller and non-neural controller interact with one another to control movement of the BBD.

15 Claims, 11 Drawing Sheets

U.S. PATENT DOCUMENTS

| | | | | |
|---|---|---|---|---|
| 5,748,847 | A * | 5/1998 | Lo | 706/14 |
| 5,781,702 | A | 7/1998 | Alhalabi et al. | |
| 5,920,851 | A * | 7/1999 | Muller | 706/20 |
| 5,987,444 | A * | 11/1999 | Lo | 706/25 |
| 6,353,814 | B1 * | 3/2002 | Weng | 706/12 |
| 6,553,300 | B2 | 4/2003 | Ma et al. | |
| 7,499,894 | B2 * | 3/2009 | Marom et al. | 706/23 |
| 7,519,452 | B2 * | 4/2009 | Seth et al. | 700/249 |
| 7,533,071 | B2 * | 5/2009 | Snook et al. | 706/20 |
| 7,627,540 | B2 * | 12/2009 | Snook et al. | 706/15 |
| 2002/0123977 | A1 | 9/2002 | Raz | |
| 2003/0033032 | A1 | 2/2003 | Lind et al. | |
| 2004/0162638 | A1 | 8/2004 | Solomon | |
| 2005/0113973 | A1 * | 5/2005 | Endo et al. | 700/245 |
| 2005/0119791 | A1 * | 6/2005 | Nagashima | 700/253 |
| 2006/0253223 | A1 * | 11/2006 | Bodenheimer et al. | 700/245 |

FOREIGN PATENT DOCUMENTS

| | | |
|---|---|---|
| EP | 15110446 | 3/2005 |
| EP | 1552908 | 7/2005 |

OTHER PUBLICATIONS

International Search Report for PCT/US06/35357, dated Sep. 28, 2007, 8 pages.

Halgamuge, et al., "Fuzzy Interpretable Dynamically Developing Neural Networks with FPGA Based Implementation," IEEE Proceedings of the Fourth International Conference on Microelectronics for Neural Networks and Fuzzy Systems, Sep. 26-28, 1994, pp. 226-234, Turin.

Miller, W.T., III, "Real-time Neural Network Control of a Biped Walking Robot," IEEE Control Systems Magazine, Feb. 1994, pp. 41-48, vol. 14, No. 1.

Arleo, A., "Modeling rodent head-direction cells and place cells for spatial learning in bio-mimetic robotics" in From Animals to Animats 6: Proceedings of the Sixth International Conference on Simulation of Adaptive Behavior, Meyer et al., Eds., 2000, MIT Press, Cambridge, MA.

Beer, R. D., "Biologically inspired approaches to robotics: what can we learn from insects?" Communications of the ACM, Mar. 1997, pp. 30-38, vol. 40, No. 3.

Browning, B. et al. "Development of a soccer-playing dynamically-balancing mobile-robot," Proceedings of the 2004 IEEE International Conference on Robotics and Automation, 2004, pp. 1752-1757.

Fajen, B. R., "A dynamical model of visually-guided steering, obstacle avoidance, and route selection," International Journal of Computer Vision, 2003, vol. 54, No. 1-3, pp. 13-34.

Fleischer, J. et al., "A neurally controlled robot competes and cooperates with humans in Segway soccer", Proceedings of the 2006 IEEE International Conference on Robotics and Automation, May 2006, pp. 3673-3678, Orlando, FL.

Gaussier, P., "From view cells and place cells to cognitive map learning: processing stages of the hippocampal system," Biological Cybernetics, 2002, vol. 86, pp. 15-28.

Guitton, D., "Control of eye-head coordination during orienting gaze shifts," Trends in Neuroscience, May 1992, vol. 15, No. 5, pp. 174-179.

Krichmar, J. et al., "Machine psychology: Autonomous behavior, perceptual categorization and conditioning in a brain-based device," Cerebral Cortex, Aug. 2002, vol. 12, No. 8, pp. 818-830.

Patla, A. E. et al., "Online steering: coordination and control of body center of mass, head and body reorientation," Experimental Brain Research, 1999, vol. 129, pp. 629-634.

Pfeifer, R. et al., "Sensory-motor coordination: The metaphor and beyond," Robotics and Autonomous Systems, 1997, vol. 20, pp. 157-178.

Segway Soccer RMP Robot Football League Rules, May 4, 2005, <<http://www.nsi.edu/nomad/segway/segwayrmp-footbalLleague.xules.pdf>>.

Seth, A. et al., "Visual binding through reentrant connectivity and dynamic synchronization in a brain-based device." Cerebral Cortex, Nov. 2004, vol. 14, No. 11, pp. 1185-1199.

Sporns, O., "Neuromodulation and plasticity in an autonomous robot," Neural Networks, 2002, vol. 15, pp. 761-774.

Uchibe, E., Competitive-cooperative-concurrent reinforcement learning with importance sampling;' in Animals to Animals 8: Proceedings of the Eight International Conference on the Simulation of Adaptive Behavior, 2004.

Weng, J., "Developmental robotics: Theory and experiments," International Journal of Humanoid Robotics, 2004, vol. 1, No. 2, pp. 199-236.

Ayers, J. et al., Eds., Neurotechnology for Biomimetic Robots, 2002, Chapters 11, 18-20, pp. 223-239 and 351-417, MIT Press, Cambridge, MA.

* cited by examiner

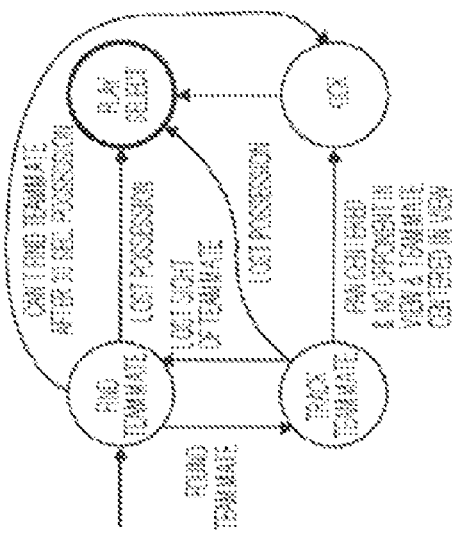
FIG. 7A PASS TO TEAMMATE
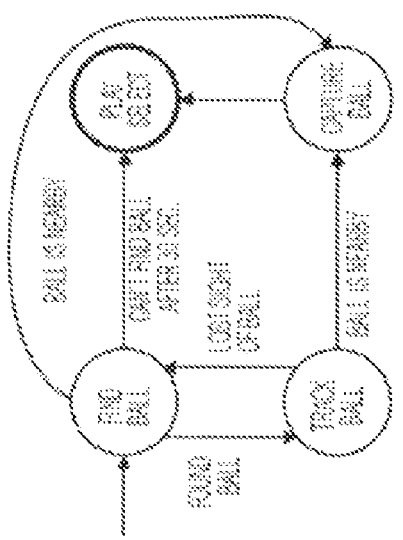
FIG. 7B CHASE THE BALL
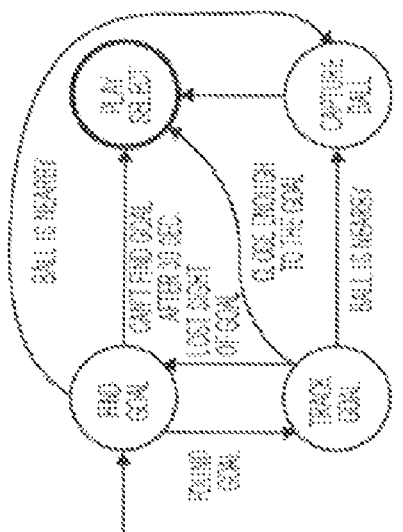
FIG. 7C RUN DOWNFIELD

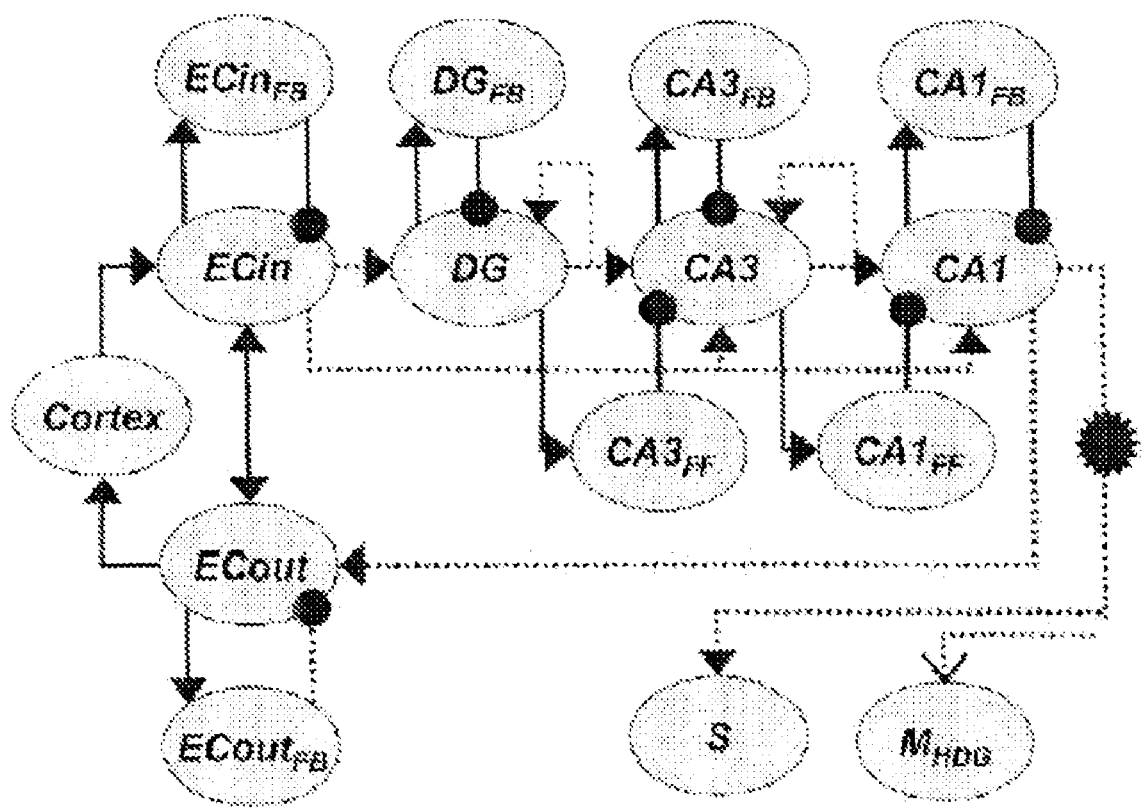
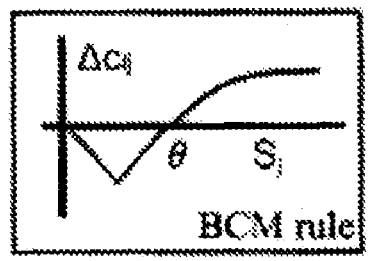
Fig. 8B

_US 7,765,029 B2_

HYBRID CONTROL DEVICE

CLAIM OF PRIORITY

This application claims priority to U.S. Provisional Application No. 60/716,821 entitled "Hybrid Control Device" filed Sep. 13, 2005, which is incorporated herein by reference.

STATEMENT REGARDING FEDERALLY SPONSORED RESEARCH AND DEVELOPMENT

This invention was made with Government support under grant N00014-03-1-0980 awarded by the Office of Naval Research. The United States Government has certain rights in the invention.

BACKGROUND OF INVENTION

The present invention concerns robots, especially robots adapted to learn about their environment.

Robots are becoming more and more popular. One class of robots that has particular interest is robots that use artificial intelligence to learn to interact with its environment.

SUMMARY OF INVENTION

Embodiments of the present invention concern Hybrid Control Systems that can consist of both neural and non-neural control elements.

BRIEF DESCRIPTION OF THE DRAWINGS

FIGS. 7A-C show finite state automata showing high level play behavior for one example of a hybrid device.

FIG. 8B shows detailed connectivity with a hippocampal region shown in FIG. 8A.

DETAILED DESCRIPTION

Aspects of the invention are illustrated by way of example and not by way of limitation in the figures of the accompanying drawings in which like references indicate similar elements. It should be noted that references to "an", "one" and "various" embodiments in this disclosure are not necessarily to the same embodiment, and such references mean at least one. In the following description, numerous specific details are set forth to provide a thorough description of the invention. However, it will be apparent to one skilled in the art that the invention may be practiced without these specific details. In other instances well-known features have not been described in detail so as not to obscure the invention.

Hybrid Control Systems can consist of both neural and non-neural control elements. In one embodiment, a device is guided by a hybrid control system, comprising of a neuronal control portion, such as a simulated nervous system, and a non-neuronal control portion, such as computational algorithms, artificial intelligence, or control system methods. The neuronal control portion can be based on a simplified model of the vertebrate nervous system. For this reason, devices under the control of the neuronal control portion can be called brain-based devices instead of robots.

Figure 1:
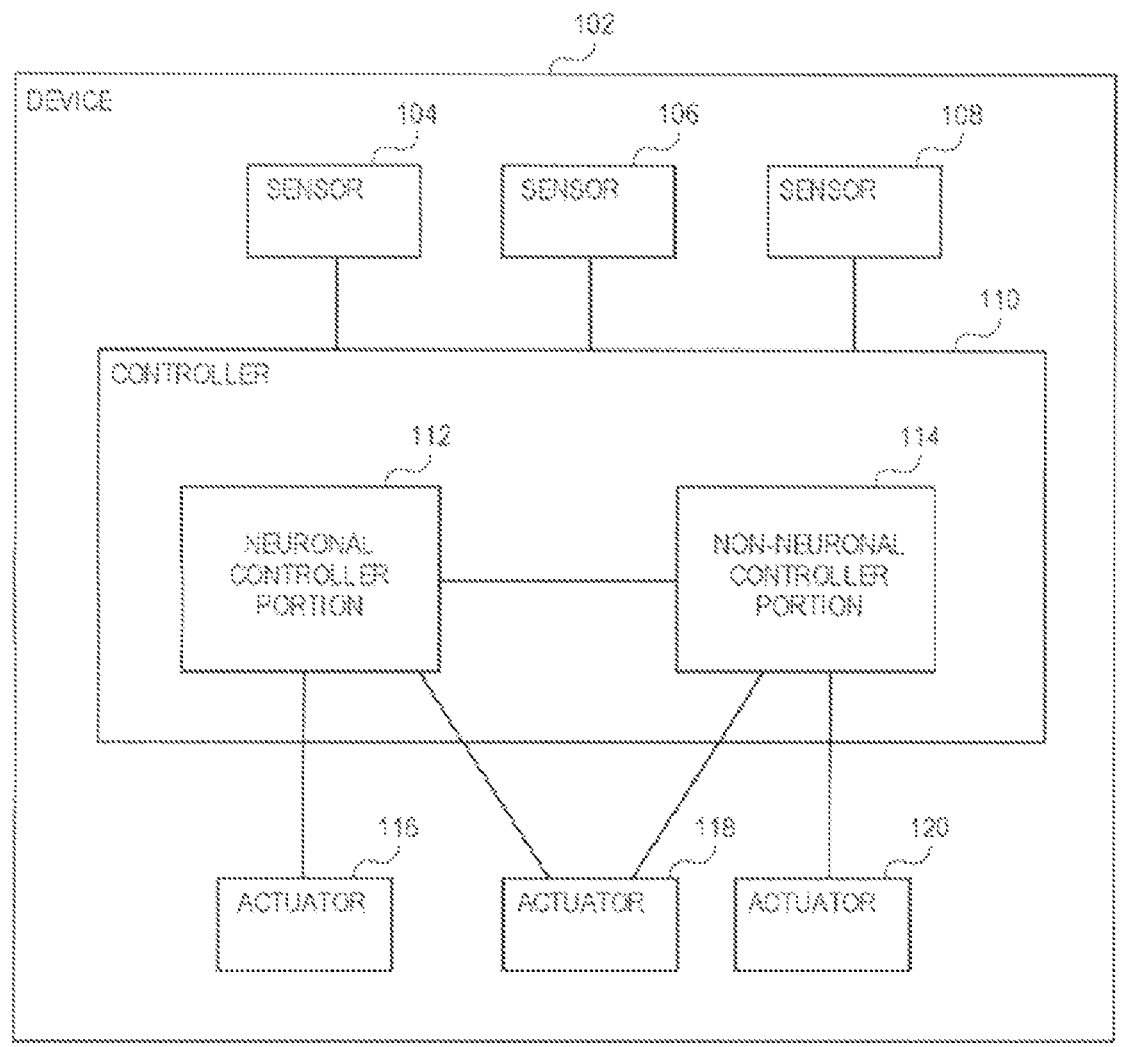
FIG. 1 is a diagram of a hybrid control device.

FIG. 1 shows a device 102 including sensors 104, 106, and 108, and a controller 110 receiving inputs from the sensors 104, 106 and 108. The controller 110 can include a neuronal controller portion 112 and a non-neuronal controller portion 114. Actuators 116, 118 and 120 can receive control commands from the controller 110.

The sensors 104, 106 and 108 can be any type of sensor including laser sensors, IR sensors, odometer sensors, such as wheel sensors, tactile sensors, cameras, and the like. The actuators can be any type of actuator including locomotion actuators such as wheel motors, steering motors, and actuators that interact with other objects such as grabbers, cameras, orientation motors and the like.

In one embodiment, at least one of the actuators 116 is controlled by the neuronal controller portion 112. At least another one of the actuators 120 can be controlled by the non-neuronal controller portion 114.

In one embodiment, an actuator 118 can be controlled by both a neuronal controller portion 112 and a non-neuronal controller portion 114.

The device 102 can be a robot. Both the neuronal controller portion 112 and the non-neuronal controller portion 114 can be located on board the device. Alternately, some portion of the controller 110 can be remote from the device and connected to the device with a link, such as a wireless link.

The neuronal controller portion 112 can have a number of neuronal units. The neuronal units can emulate neurons or groups of neurons.

In one embodiment, a neuronal unit can be simulated by a mean firing rate model. The mean firing rate variable of each neuronal unit can correspond to the average activity of a group of about 100 real neurons during a time period of about 30 ms.

In one embodiment, there are two types of connections in the model, voltage-independent (VI) and voltage-dependent (VD). VI connections only inject current into a neuronal unit that already has activity. VD connections inject current regardless of the post synaptic activity.

The pre-synaptic input due to VI connections to the activity of neuronal unit i can be given by $$A_i^{VI}(t) = \sum_{l=1}^{M} \sum_{j=1}^{N_i^l} C_{ij} S_j(t)$$

where M is the number of different anatomically defined connection types and $N_i^l$ is the number of connections per anatomical type 1 projecting to neuronal unit i. This presynaptic input can in turn produce a post-synaptic activity due to VI connections:

$$POST_i^{VI}(t) = \omega \cdot POST_i^{VI}(t-1) + (1-\omega) \cdot A_i^{VI}(t)$$

where ω is a term that regulates persistence of activity from previous time-steps.

Thus, the VD contribution to the inputs of unit i is $$A_i^{VD}(t) = \Phi\left( POST_i^{VI}(t) \cdot \sum_{l=1}^{M} \sum_{j=1}^{N_i^l} (c_{ij} \cdot s_j(t)) \right)$$

where $\Phi(x)=0$ for $x<\sigma_i^{fire}$, otherwise $\Phi(x)=x$. The post-synaptic activity from VD connections is then $$POST_i^{VD}(t) = \omega \cdot POST_i^{VD}(t-1) + (1-\omega) \cdot A_i^{VD}(t).$$

The total post-synaptic influence on the unit i is therefore $POST_i = POST_i^{VI} + POST_i^{VD}$. This input influence in turn dictates the firing rate of neuronal unit i. The mean firing rate ($s_i$) can range from 0 (quiescent) to 1 (maximal firing), such that, $$s_i(t+1) = \Phi(\tan h(g_i \cdot (POST_i(t) + \omega \cdot s_i(t))))$$

where g is a scaling factor.

In brain-based devices some connections can modify their strength depending on the experience of the device. These plastic connections can come in two varieties, those that are dependent on a value signal, and those that are value-independent. Value dependent connections can learn according to:

$$\Delta c_{ij}(t+1) = \eta \cdot s_i(t) \cdot s_j(t) \cdot BCM(s_i(t)) \cdot (V(t) - V(t-1))$$

where η is a fixed learning rate, $s_i(t)$ and $s_j(t)$ are the activities of the post and pre-synaptic units respectively and V(t) is the current mean activity in a value neuronal area, which produces a signal indicating that something about the current environment is salient to the learning task. This is a form of temporal difference learning. The non-linear transfer function BCM() can be based on the rule of Bienenstock, Cooper, and Munroe. The function BCM can be implemented as a piecewise linear function, taking post-synaptic activity as input, which is defined by a sliding threshold, θ, two inclinations ($k_1, k_2$) and a saturation parameter ρ(ρ=6 throughout):

$$BCM(s) = \begin{cases} -k_1 s; & s \leq \theta/2 \\ k_1(s-\theta); & \theta/2 < s \leq \theta \\ k_2 \tanh(\rho(s-\theta))/\rho; & \text{otherwise} \end{cases}$$

Value independent connections can be modified according to $$\Delta c_{ij}(t+1) = \eta \cdot s_i(t) \cdot s_j(t) \cdot BCM(s_i(t))$$

and then can be normalized to prevent unbounded potentiation over time $$c_{ij} = \frac{c_{ij}}{\sqrt{\sum_{k=1}^{K} c_{ik}^2}}$$

where K is the total number of connections to unit i

Examples of devices with hybrid control described below include the Segway Soccer Brain Based Device (SS-BBD) and Darwin++. The descriptions contained herein indicate how information flows between neural and non-neural components.

Figure 2A:
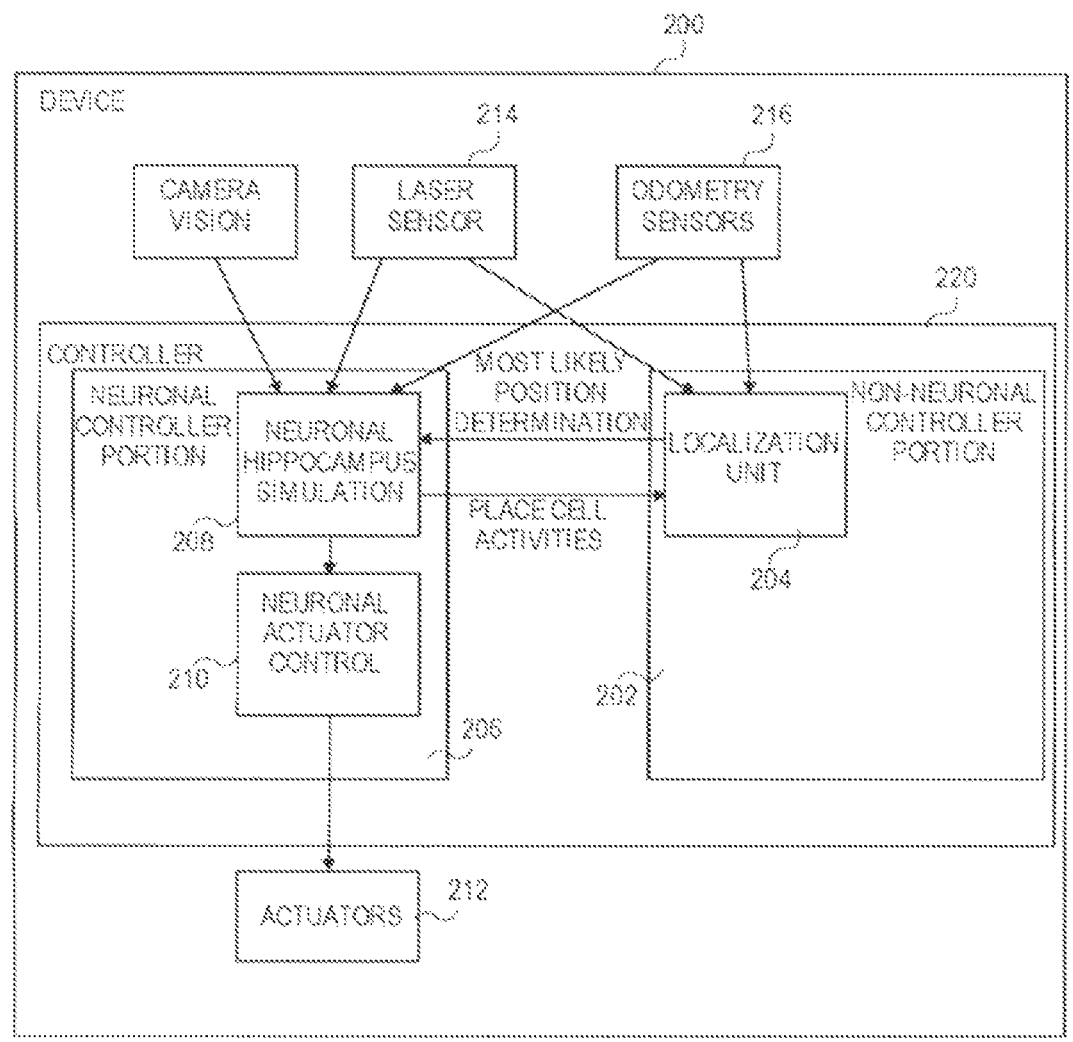
FIGS. 2A-2B show a first example of a hybrid control device.

FIG. 2A shows an example of a hybrid control device 200. In this example, the non-neural controller portion 202 includes artificial intelligence to do localization. In one embodiment, a localization unit 204 uses data from and provides data to the neuronal controller portion 206.

The localization unit 204 can be a probabilistic localization unit. The probabilistic localization unit 204 can create estimate(s) of the position of the device. The probabilistic localization unit 204 can recalculate the estimate(s) with sensor data and a predicted change in position and orientation caused by actuators. The probabilistic localization unit 204 can use Bayesian estimates logic to produce the estimate(s).

In one embodiment, the probabilistic localization unit 204 can use particle filter localization. Particle filter localization can maintain a number of potential positions (or "particles") which can each be updated with sensor data and predicted change in position information. Based on the sensor data a probability can be associated with each position. The particles can be used to produce a final position estimate. In one embodiment, a weighted means of the particles can be used to create the final position estimate.

In one embodiment, the neuronal controller portion 206 includes a neuronal hippocampus simulation 208 and a neuronal actuator control 210. The localization unit 204 can allow the neuronal controller portion 206 to produce a better location determination. The hippocampus simulation 208 can produce information to help update the position estimate(s) and probability estimates for the localization unit 204. In the example of FIG. 2A, the location determination of the neuronal hippocampus simulation 208 can be sent to the neuronal actuator control 210 which can control actuators 212. The laser sensor 214 and odometry sensors 216 can be used by both the neuronal controller portion 206 and non-neuronal controller portion 202.

The localization unit 204 can be a simultaneous localization and mapping (SLAM) unit. SLAM can simultaneously create maps while localizing the robot's position.

One embodiment of the present invention is a device 200 comprising sensors 214 and 216, and a controller 220 receiving inputs from the sensors. The controller 220 can include a neuronal controller portion 206 and a non-neuronal controller portion 202. The non-neuronal controller portion 202 can include a localization module. The localization module 204 can provide data to the neuronal controller portion. Acutators 212 can receive control commands from the controller 220.

The neuronal controller portion 206 can provide data to the localization unit 204. At least one of the actuators 212 can be controlled by the neuronal controller portion 206. The device 200 can be a robot.

Darwin++ is a hybrid model that combines probabilistic localization algorithms with the ability of the brain region called the hippocampus to encode information about location. Darwin++ is based on the hippocampus model of Darwin X (see Appendix), but adds non-neural components that map the environment and determine the robot's location on that map. Information flows from the localization module to the neural simulation, and then in turn back from the simulation to alter the localization module's hypothesis of location. The location of the device can be determined through a particle filter, which maintains many localization hypotheses (particles). At every time step all the particles can be updated according to the sensory data and motor commands, producing a new most likely location for the device.

When a particular particle becomes very unlikely to be the correct location given the data, it can vanish from the filter. In a normal particle filter the hypothesis is replaced with a randomly sampled copy of one of the surviving particles. In one embodiment, it can be replaced with a hypothesis extracted from the place cell activity in CA1. This system is otherwise substantially similar to the one described in the Appendix, which will give further information on the nature of the hippocampal model, the action selection and value dependent learning.

In one embodiment, a hippocampus localization BBD is a navigation system that demonstrates localization, path planning, and goal-directed behavior in natural environments. The system can combine visual, laser, and self-movement information to localize its position and an action selection system to plan paths. In one embodiment, because the system relies on associative memory, the system can be robust to sensor failure and can still navigate effectively when one or more of the sensors are compromised.

Figure 2B:
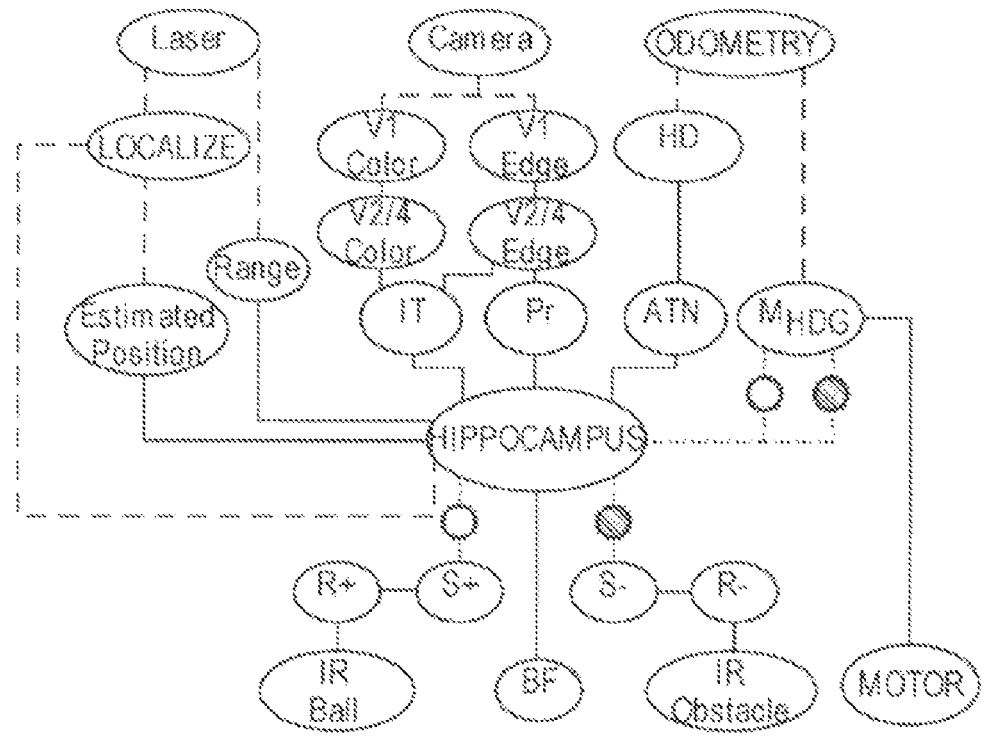

FIG. 2B shows details of the neural architecture of Darwin++. Sensory inputs feed through cortical areas before reaching the hippocampal complex. Laser information can take two paths to the hippocampus; first range data can be directly fed to the hippocampus as sensory information, secondly the non-neural localization algorithms can produce an estimate of location on a map of the room that is encoded topographically in a neural area feeding the hippocampus. The hippocampal loops can then process the information, with output from hippocampal area CA1 going to the motor areas, which in turn drive the wheels. The output from CA1 can also be used to produce new location hypotheses for the localization module. In one embodiment, the neural simulation can have 90000 cells and 1.5 million synapses.

TABLE 1

Values of parameters defining properties of neuronal units in Darwin++.

| Neural Area Name | Area | Size | σ-fire | σ- | Ω | g |
| --- | --- | --- | --- | --- | --- | --- |
| Primary Visual Cortex | V1 (8) | 60 × 80 | — | — | — | — |
| Head Direction System | HD | 1 × 360 | — | — | — | — |
| Positive Value | R+ | 1 × 1 | — | — | — | — |
| Negative Value | R− | 1 × 1 | — | — | — | — |
| Basal Forebrain | BF | 1 × 1 | — | — | — | — |
| Visual Cortex - Color | V2/4-color (4) | 6 × 8 | 0.20 | 0.10 | 0.0 | 1.0 |
| Visual Cortex - Spatial tuning | V2/4-width (4) | 15 × 20 | 0.20 | 0.10 | 0.0 | 1.0 |
| Infemtemporal cortex | IT | 30 × 30 | 0.20 | 0.10 | 0.0 | 1.0 |
| IT inhibitory interneurons | ITi | 15 × 15 | 0.20 | 0.10 | 0.15 | 1.0 |
| Parient cortex | PR | 30 × 30 | 0.20 | 0.10 | 0.0 | 1.0 |
| Anterior Thalamic Nucleus | ATN | 30 × 30 | 0.10 | 0.10 | 0.50 | 1.0 |
| ATN inhibitory interneurons | ATNi | 30 × 30 | 0.10 | 0.10 | 0.15 | 1.0 |
| Motor area for heading | $M_{HDG}$ | 1 × 60 | 0.0 | 0.10 | 0.0 | 1.0 |
| $M_{HDG}$ inhibitory interneurons | $M_{HDG}i$ | 1 × 60 | 0.0 | 0.10 | 0.0 | 1.0 |
| Value System - Positive | S+ | 4 × 4 | 0.0 | 0.10 | 0.0 | 1.0 |
| Value System - Negative | S− | 4 × 4 | 0.0 | 0.10 | 0.0 | 1.0 |
| Enterbinal Cortex - Input | $EC_{IN}$ | 30 × 30 | 0.10 | 0.10 | 0.50 | 1.0 |
| $EC_{IN}$ inhibitory interneurons | $EC_{IN}i$ | 15 × 15 | 0.02 | 0.10 | 0.0 | 1.0 |
| Enterbinal Cortex - Output | $EC_{OUT}$ | 30 × 30 | 0.10 | 0.10 | 0.50 | 1.0 |
| $EC_{OUT}$ inhibitory interneurons | $EC_{OUT}i$ | 15 × 15 | 0.02 | 0.10 | 0.0 | 1.0 |
| Dentate Gyrus | DG | 30 × 30 | 0.10 | 0.10 | 0.50 | 0.75 |
| DG Feedback inhibitory interneurons | $DG_{FB}i$ | 15 × 15 | 0.02 | 0.10 | 0.0 | 1.0 |
| CA3 Hippocampal Subfield | CA3 | 15 × 15 | 0.05 | 0.10 | 0.50 | 0.75 |
| CA3 Feedback inhibitory interneurons | $CA3_{FB}i$ | 8 × 8 | 0.02 | 0.10 | 0.0 | 1.0 |
| CA3 Feedforward inhibitory interneurons | $CA3_{FF}i$ | 15 × 15 | 0.02 | 0.10 | 0.0 | 1.0 |
| CA1 Hippocampal Subfield | CA1 | 20 × 20 | 0.05 | 0.10 | 0.50 | 0.75 |
| CA1 Feedback inhibitory interneurons | $CA1_{FB}i$ | 10 × 10 | 0.02 | 0.10 | 0.0 | 1.0 |
| CA1 Feedforward inhibitory | $CA1_{FF}i$ | 10 × 10 | 0.02 | 0.10 | 0.0 | 1.0 |
| Estimated position from localization | $LOC_{IN}$ | 30 × 30 | 0.2 | 0.0 | 0.0 | 1.0 |
| Estimate position from hippocampus | $LOC_{OUT}$ | 30 × 30 | 0.02 | 0.1 | 0.5 | 1.0 |

Table 1 shows values of parameters defining properties of neuronal units in one embodiment of a Darwin++ system. Areas V1, HD, $LOC_{IN}$, R+, and R− are input areas and their activity is based on the camera image, odometry, probabilistic localization algorithm, and IR sensors respectively. Areas V1 and V2/V4 have 4 sub-areas tuned for color (red, green, blue, and yellow) and 4 sub-areas tuned for varying width vertical bars. An area with a lower case i in its name (e.g. $EC_{IN}i$) contains inhibitory neuronal units. The table indicates the number of neuronal units in each area or sub-area (Size). Neuronal units in each area have a specific firing threshold (σ-fire), a threshold above which voltage-dependent connections can have an effect (σ-vdep), a persistence parameter (ω) and a scaling factor (g).

| Projection | Arbor | p | cij(0) | type | φ | η | k1 | k2 |
|---|---|---|---|---|---|---|---|---|
| V1-color→V2/4-color | [ ] 1 × 1 | 0.00 | 0.03, 0.05 | VI | — | — | — | — |
| V2/4-color→V2/4-color(intra) | [ ] 2 × 2 | 0.40 | 0.5, 0.6 | VD | — | — | — | — |
| V2/4-color→V2/4-color(inter) | [ ] 3 × 3 | 1.00 | −0.0012, '0.28 | VI | — | — | — | — |
| V1-width→V2/4-width | [ ] 1 × 1, 2 × 2, 3 × 3, 4 × 4 | 1.00 | 0.008, 0.009 | VI | — | — | — | — |
| V2/4-width→V2/4-width(intra) | [ ] 2 × 2 | 0.40 | 0.5, 0.6 | VD | — | — | — | — |
| V2/4-width→V2/4-width(inter) | [ ] 3 × 3 | 1.00 | −0.012, −0.014 | VI | — | — | — | — |
| V2/V4→IT | non-topo | 0.03 | 0.03, 0.04 | VI | — | — | — | — |
| IT→IT | [ ] 1 × 1 | 1.00 | 0.006, 0.14 | VI | — | — | — | — |
| IT→FE | Θ 2, 3 | 1.00 | 0.05, 0.06 | VI | — | — | — | — |
| FE→IT | [ ] 3 × 3 | 1.00 | 0.36, 0.50 | VI | — | — | — | — |
| V2/V4→Pr | [ ] 3 × 1 | 0.25 | 0.25, 0.30 | VD | — | — | — | — |
| Pr→Pr | Θ 4, 6 | 1.00 | 0.06, 0.08 | VI | — | — | — | — |
| HD→ATN | [ ] 10 × 2 | 0.20 | 0.01, 0.02 | VI | — | — | — | — |
| ATN→ATNi | Θ 10, 15 | 0.25 | 0.01, 0.02 | VI | — | — | — | — |
| ATNi→ATN | [ ] 1 × 1 | 1.00 | −0.30, 0.50 | VI | — | — | — | — |
| HD→$M_{HDG}$ | [ ] 1 × 1 | 1.00 | 0.01, 0.01 | VI | — | — | — | — |
| $M_{HDG}$→$M_{HDG}$i | Θ 20, 30 | 0.50 | 0.10, 0.20 | VI | — | — | — | — |
| $M_{HDG}$i→$M_{HDG}$ | [ ] 1 × 1 | 1.00 | 0.36, 0.50 | VI | — | — | — | — |
| ATN→$EC_{IN}$ | non-topo | 0.001 | 0.40, 0.50 | VI | — | — | — | — |
| IT→$EC_{IN}$ | non-topo | 0.001 | 0.40, 050 | VI | — | — | — | — |
| Pr→$EC_{IN}$ | non-topo | 0.001 | 0.40, 0.50 | VI | — | — | — | — |
| $LOC_{IN}$→$EC_{IN}$ | non-topo | 0.001 | 0.40, 0.50 | VI | — | — | — | — |
| $EC_{IN}$→$EC_{OUT}$ | non-topo | 0.05 | 0.04, 0.08 | VI | — | — | — | — |
| $EC_{IN}$→$EC_{IN}$ | Θ 2, 3 | 0.10 | 0.05, 0.00 | VI | — | — | — | — |
| $EC_{IN}$→$EC_{IN}$ | [ ] 1 × 1 | 1.00 | −0.60, −1.20 | VI | — | — | — | — |
| $EC_{IN}$→DG | [ ] 3 × 3 | 0.10 | 0.45, 0.60 | VI | 0.75 | 0.05 | 0.00 | 0.45 |
| $EC_{IN}$→CA3 | [ ] 3 × 3 | 0.05 | 0.15, 0.20 | VI | 0.75 | 0.05 | 0.00 | 0.45 |
| $EC_{IN}$→CA1 | [ ] 3 × 3 | 0.04 | 0.30, 0.40 | VI | 0.75 | 0.05 | 0.00 | 0.45 |
| $EC_{OUT}$→ATN | non-topo | 0.01 | 0.40, 0.45 | VD | — | — | — | — |
| $EC_{OUT}$→IT | non-topo | 0.01 | 0.40, 0.45 | VD | — | — | — | — |
| $EC_{OUT}$→Pr | non-topo | 0.01 | 0.40, 0.45 | VD | — | — | — | — |
| $EC_{OUT}$→$EC_{IN}$ | non-topo | 0.05 | 0.04, 0.08 | VI | — | — | — | — |
| $EC_{OUT}$→$EC_{OUT}$i | Θ 2, 3 | 0.10 | 0.45, 0.60 | VI | — | — | — | — |
| $EC_{OUT}$i→$EC_{OUT}$ | [ ] 1 × 1 | 1.00 | 0.90, 1.20 | VI | — | — | — | — |
| DG→CA3 | [ ] 3 × 3 | 0.00 | 0.45, 0.60 | VI | — | — | — | — |
| DG→DG | [ ] 3 × 1 | 1.00 | 0.30, 0.50 | VI | — | — | — | — |
| DG→$DG_{FB}$i | Θ 2, 3 | 0.10 | 0.45, 0.60 | VI | — | — | — | — |
| $DG_{FB}$i→DG | [ ] 1 × 1 | 1.00 | −0.90, −1.20 | VI | — | — | — | — |
| DG→$CA3_{FF}$i | Θ 2, 3 | 0.10 | 0.45, 0.60 | VI | — | — | — | — |
| $CA3_{FF}$i→CA3 | [ ] 1 × 1 | 1.00 | −0.90, −1.20 | VI | — | — | — | — |
| CA3→CA1 | [ ] 3 × 3 | 0.08 | 0.45, 0.60 | VI | 0.75 | 0.05 | 0.90 | 0.45 |
| CA3→CA3 | non-topo | 0.10 | 0.15, 0.20 | VI | 0.75 | 0.05 | 0.90 | 0.45 |
| CA3→$CA3_{FB}$i | Θ 2, 3 | 0.10 | 0.45, 0.60 | VI | — | — | — | — |
| $CA3_{FB}$i→CA3 | [ ] 1 × 1 | 1.00 | −0.90, −1.20 | VI | — | — | — | — |
| CA3→$CA1_{FF}$i | Θ 2, 3 | 0.10 | 0.45, 0.60 | VI | — | — | — | — |
| $CA1_{FF}$i→CA1 | [ ] 1 × 1 | 1.00 | −0.90, −1.20 | VI | — | — | — | — |
| CA1→$EC_{OUT}$ | [ ] 3 × 3 | 0.25 | 0.60, 0.75 | VI | 0.75 | 0.05 | 0.90 | 0.45 |
| CA1→$M_{HDG}$# | [ ] 3 × 3 | 1.00 | 0.01, 0.02 | VD | — | 0.05 | 0.90 | 0.45 |
| CA1→$M_{HDG}$* | [ ] 3 × 3 | 1.00 | 0.01, 0.02 | VD | — | 0.05 | 0.90 | 0.45 |
| CA1→S+ # | [ ] 3 × 3 | 1.00 | 0.01, 0.02 | VD | — | 0.005 | 0.90 | 0.45 |
| CA1→S− * | [ ] 3 × 3 | 1.00 | 0.01, 0.02 | VD | — | 0.0005 | 0.90 | 0.45 |
| CA1→$LDC_{OUT}$ | [ ] 1 × 1 | 1.00 | 0.01, 0.02 | VD | — | 0.001 | 0.90 | 0.45 |
| R+→S+, R−→S− | non-topo | 1.00 | 0.25, 0.25 | VI | — | — | — | — |
| BF→ $EC_{IN}EC_{OUT}$DG, CA3, CA1 | non-topo | 0.05 | −0.01, −0.02 | VI | — | — | — | — |
| S+→$M_{ADG}$ | non-topo | 1.0 | 0.05, 0.06 | VD | — | — | — | — |
| S−→$M_{ADG}$ | non-topo | 1.0 | −0.05, −0.06 | VD | — | — | — | — |
| $LOC_{IN}$→$LOC_{OUT}$ | [ ] 1 × 1 | 1.0 | 0.3, 0.5 | VI | — | — | — | — |

Table 2 shows properties of anatomical projections and connection types in an embodiment of a Darwin++ system. A presynaptic neuronal unit connects to a postsynaptic neuronal unit with a given probability (p) and given projection shape (Arbor). This arborization shape can be rectangular "[]" with a height and width (h×w), doughnut shaped or a ring of lateral connections "Θ" with the size of the ring constrained by an inner and outer radius (r1, r2), or non-topographical "non-topo" where any pairs of presynaptic and postsynaptic neuronal units have a given probability of being connected. The initial connection strengths, (0), are set randomly, with a uniform distribution, within the range given by a minimum and maximum value (min, max). A negative value for cij(0) indicates inhibitory connections. Connections marked with "intra" denote those within a visual sub-area and connections marked with "inter" denote those between visual sub-areas. Projections marked # are positive value-dependent; they use the S+ area for TD learning. Projections marked * are negative value-dependent and use the S− area for TD learning. A connection type can be voltage independent (VI), or voltage-dependent (VD). denotes the persistence of the connection. Nonzero values for η, k1 and k2 signify plastic connections.

Figure 3A:
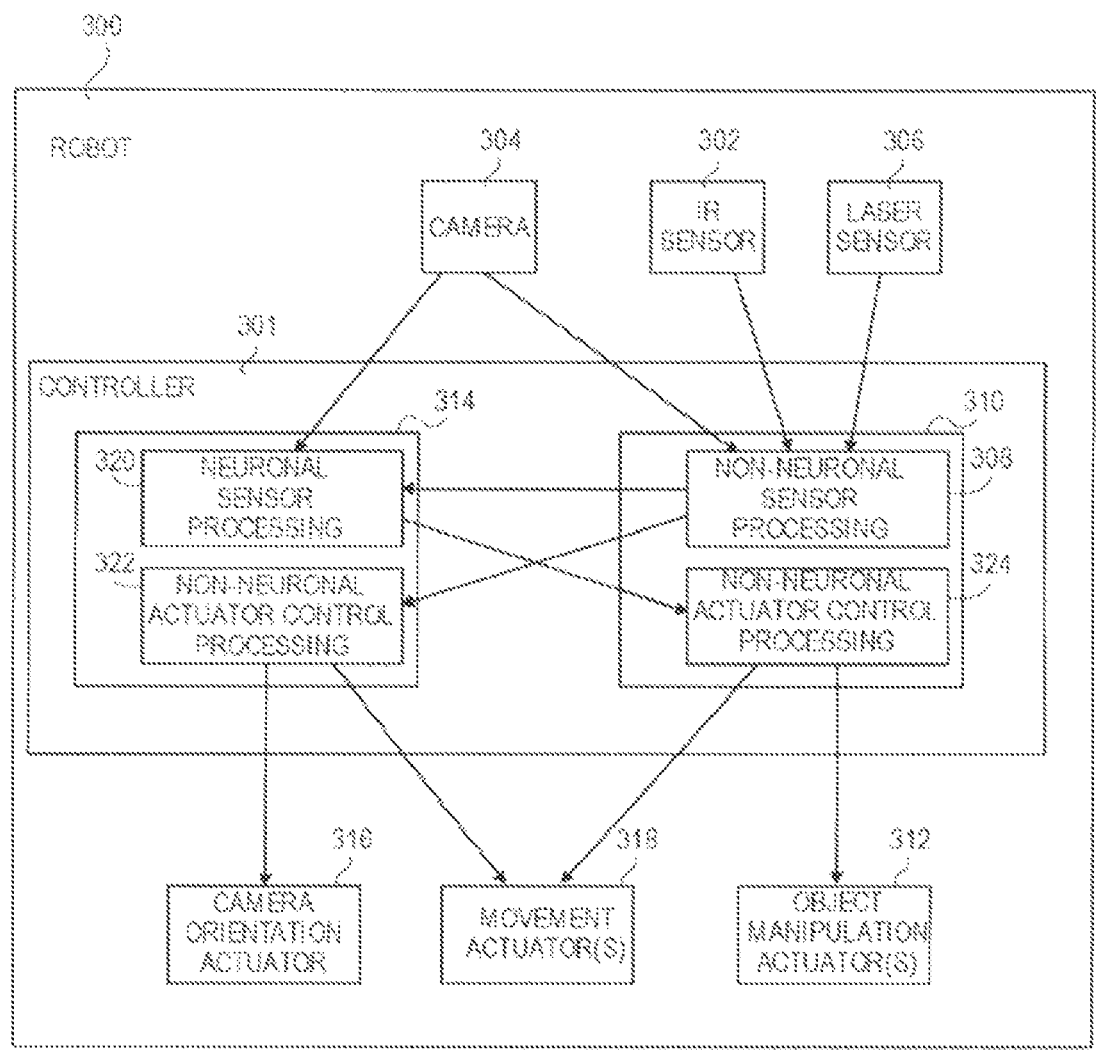
FIGS. 3A-3C show a second example of a hybrid control device.

FIG. 3A shows another example of a hybrid device 300. In this example, information from the sensors, such as IR sensor 302, camera 304, and laser sensor 306 can be sent to non-neural sensor processing 308. The non-neural controller 310 can control at least one actuator, such as object manipulator actuator(s) 312. The neuronal controller portion 314 can control at least one actuator, such as the camera orientation actuator 316. In one embodiment, the neural controller portion 314 and non-neural controller portion 310 can share the control of an actuator, such as the movement actuator 318. For example, the neural controller portion 314 can control the movement actuator(s) 318 with an override by the non-neuronal controller portion 310.

The neuronal and non-neuronal control portions 314 and 316 can each have sensor processing portions 320 and 308 and actuator control portions 322 and 324. Signals can be sent between these sections as needed.

In one embodiment, laser and IR data can stay completely on the non-neural controller side and can be used to generate motor commands and actuate the ball-catchers by non-neural controllers. A pathway can be positioned from the sensory processing component to the actuator component.

The device 300 can be a robot, such as a mobile robot. The neuronal controller portion 314 and the non-neuronal controller portion can be on the robot.

Figure 3B:
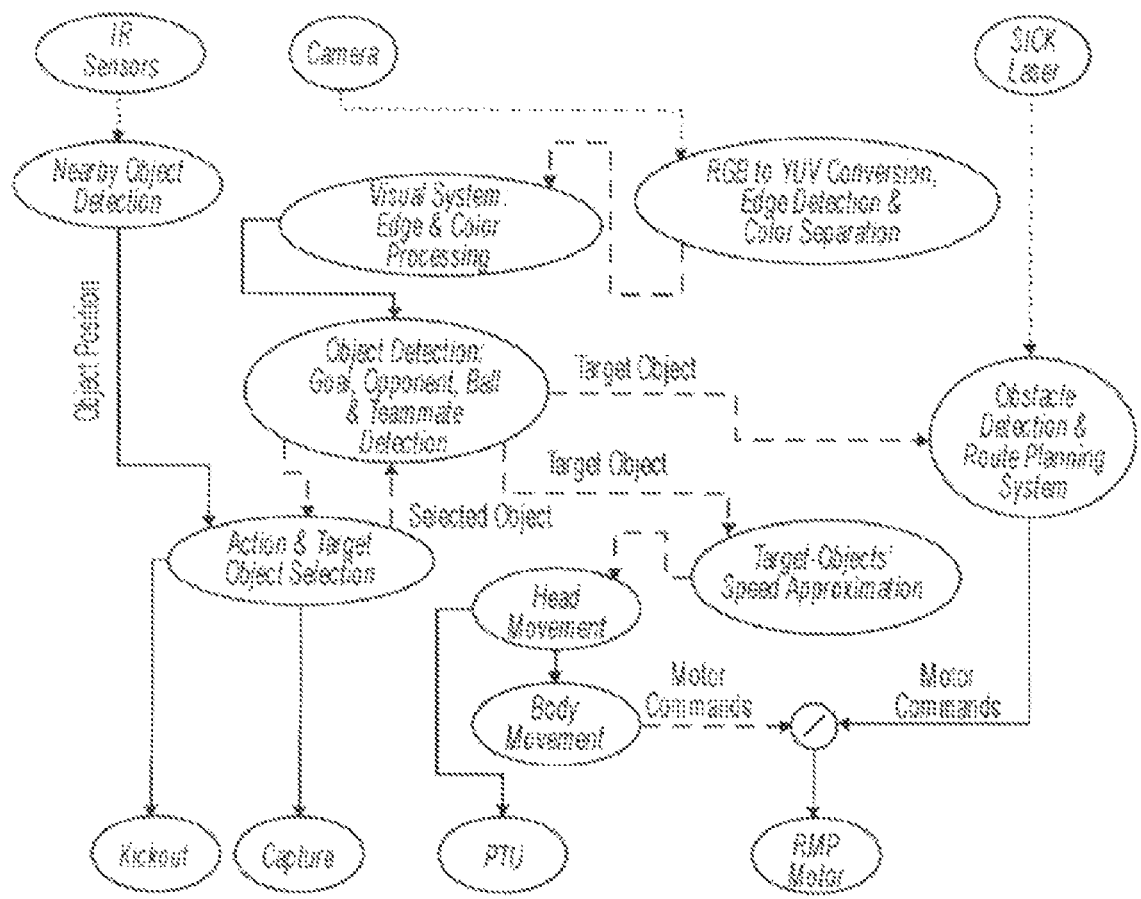

The Segway Soccer Brain-Based Device (SS-BBD) is an exemplary hybrid control system, comprising of both a simulated nervous system neuronal control processing and more traditional robot control algorithms. The simulated nervous system can be based on a simplified model of a vertebrate nervous system. The neural simulation can be primarily responsible for sensorimotor control, and the non-neural controllers can provide higher level action selection. FIG. 3B depicts an architecture of an exemplary hybrid control system, which can be described as follows. IR sensors, a camera and a laser rangefinder provide sensory input for the system. Action and Target Object Selection can be the central module; it can receive non-neural input from the IR sensors about the nearby objects and also get visual data interpreted by the neural visual system. Action and Target Object Selection can send direct commands to some actuators and indirect ones to the SS-BBD's wheel through Head and Body movement neuronal areas. The device's movement may also be affected by an obstacle detection and avoidance mechanism (Route Planning System).

The early stages of vision can be of a non-neural nature. RGB camera images can be converted by mathematical algorithms to YUV colorspace images. The Y component (light intensity information) can be edge-detected by mathematical algorithms. The UV components (color information) of the image can be compared previously generated lookup tables of salient colors. The lookup tables can represent the probability that a specific color in the image matches one of the salient colors.

Neural processing can begin in the next stage; edge-filtered images can be turned into activity values in neuronal groups that represent edge information and the probabilistic representations of salient colors can be turned into activity in neuronal groups representing these colors. These groups can be roughly equivalent to areas in the primary and secondary visual cortices.

These color and edge groups can be connected to neuronal groups whose activity represents the presence of certain salient objects in the visual field, such as soccer balls. These groups can have a function that is similar to that of inferotemporal and parietal cortices.

Motor neuronal areas can control the head (pan-tilt camera) and body (wheel speeds) of the SS-BBD. Activity in these groups can drive the device to approach whatever target object is currently being tracked, unless there is an overriding motor.

The ball-handling actuators can be driven directly by the non-neural action selection controllers.

A non-neural algorithm can be responsible for deciding what object is salient at any given time, and whether that object should be approached or merely tracked while staying in place. For instance, the SS-BBD might be tracking an opponent but then the ball rolls nearby and should be captured. The action selection mechanism can be responsible for making the decision to change targets. Action selection can use information from the neural visual areas representing target objects to make these decisions. It also can use non-neurally processed information from IR sensors. Action selection can create a temporary connection between whatever object neuronal group it decides to track a ball through the Head and Body neuronal group, therefore creating the neural control loop to track that object automatically.

A non-neural algorithm can use information from the laser rangefinder and the IR sensors to determine if there is an obstacle nearby that needs to be avoided. In that case it tries to balance the need to approach the current target object (selected by the action selection mechanism) with the need to not strike the obstacle. The information about obstacle location can come from the laser data, and the information about obstacle location can be extracted from activities in the target object neuronal area. When an obstacle is present, motor output from the obstacle avoidance module can override output from the Body Movement neuronal group.

Figure 4:
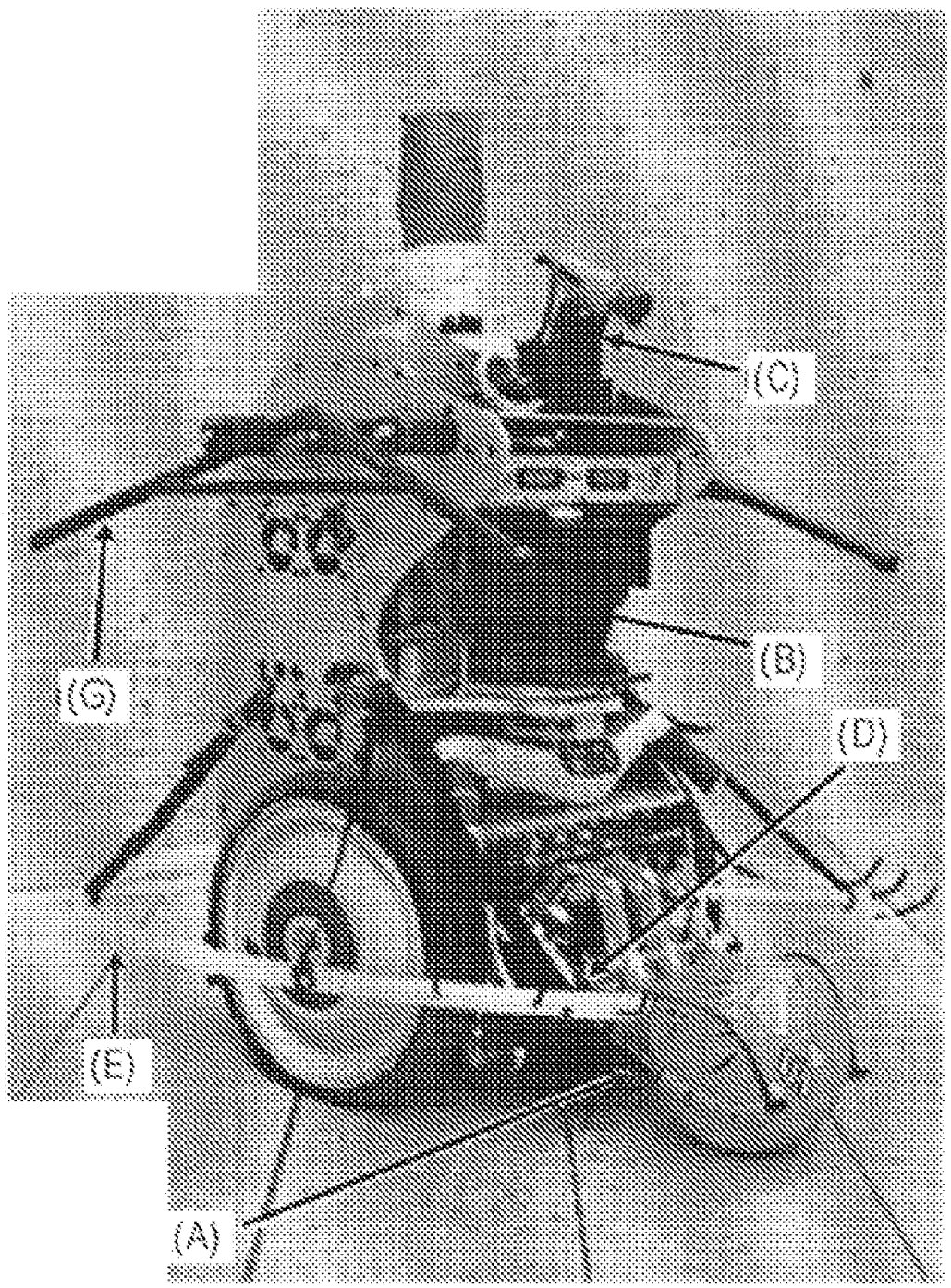
FIG. 4 shows a hybrid control device on a separate robot platform.

FIG. 4 shows a SS-BBD device. These devices can include: (A) active capture devices, (B) laser rangefinder, (C) pan-tilt unit and camera, (D) kicking assembly, (E) passive capture ring, (G) crash bars.

The SS-BBD can be based on the Segway Robotic Mobility Platform, a commercially available robot version of the Segway Human Transporter. An aluminum chassis sits on the commercial base, containing a cluster of six compact Pentium IV PCs and enough battery capacity to power it for 45 minutes. A set of shock-mounted crash arms protect the device in case of collision or failure of the balance controller. The SS-BBD can possess various sensory systems, including a color camera, a laser rangefinder, and a digital compass. Banks of short range IR proximity sensors can be mounted low around the device to detect nearby soccer balls. One bank of IR sensors can be mounted on the back above ball height to detect nearby non-ball obstacles that are outside the sensing arc of the front-mounted camera and laser rangefinder.

The SS-BBD can possess solenoid actuated devices that enable it to handle a soccer ball. A pair of flexible jaw-like plastic catchers can pinch a ball firmly against the front of the device, allowing it to rotate in place with a ball. To kick the ball, the catchers can be raised and a second set of solenoids can actuate a four-bar linkage that delivers thrust to the ball. A passive device aids in capturing incoming balls on the sides and back: a ring of flexible plastic mounted on straps can absorb the impact of incoming balls, allows them slip under the ring, and then traps them against the device. The low mounted IR sensors can then detect on which side of the device the ball is located, and a simple pivot-in place motion allows the device to turn until the ball is on its front face, at which point it captures the ball with the solenoid-driven catchers.

FIG. 3B describes the overall architecture of a control system of one embodiment, which can be described as follows. IR sensors, a firewire camera and a laser rangefinder can provide sensory input for the system. Action Selection can have the central module; it can receive input from the IR sensors about the nearby objects and also get visual data interpreted by the neural visual system. Action Selection can send direct commands to some actuators and indirect ones to the SS-BBD's wheel through Head and Body movement neuronal areas. The device's movement may also be affected by an obstacle detection and avoidance mechanism (Route Planning System).

In one embodiment, to ensure effective behavior, the robot soccer can require fast, robust visual information processing to identify objects on the playing field. In this section, the methods and architecture applied to satisfy this requirement are described.

Figure 3C:
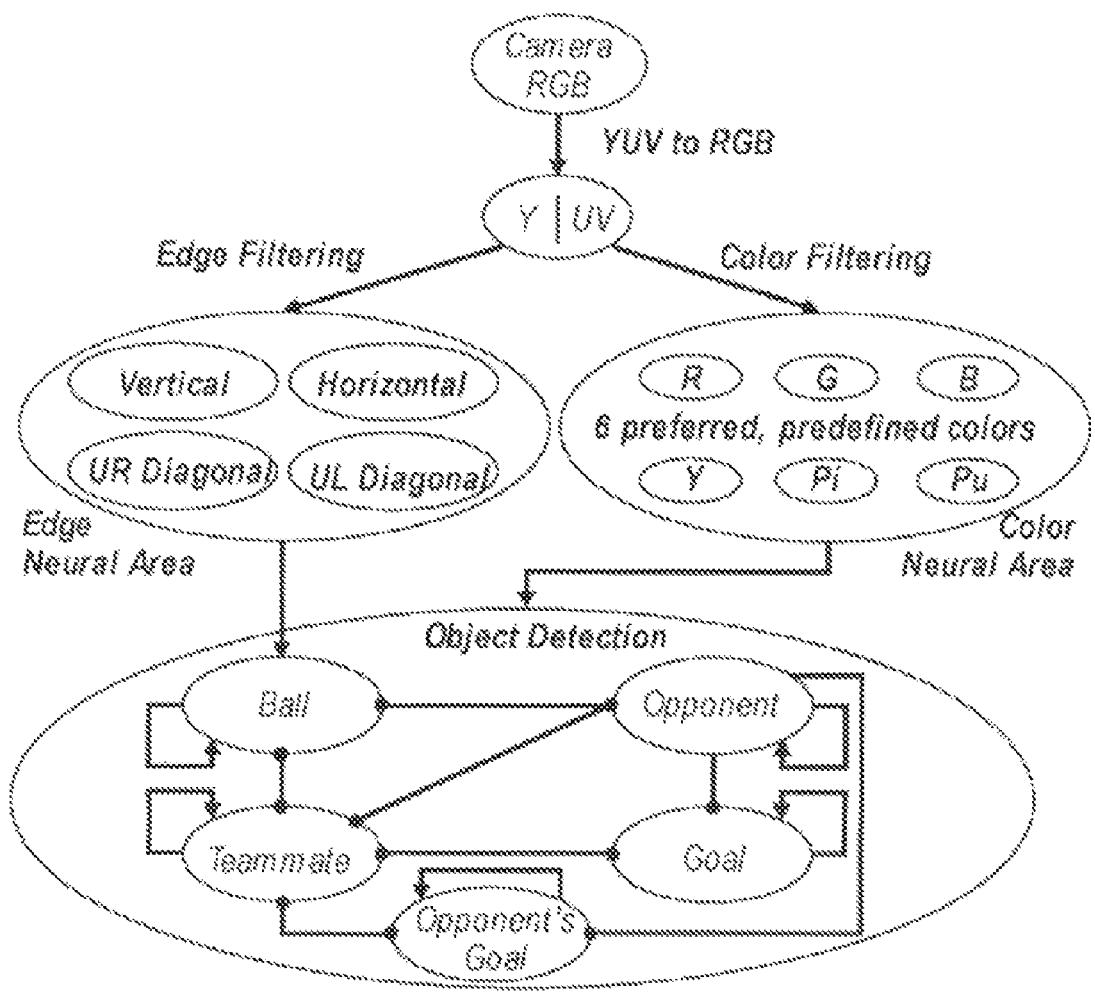

The visual information can be provided to the SS-BBD by a Sony IEEE 1394 camera equipped with a wide angle lens working at 30 frames per second and 640×480 pixels. The raw sensory pixel data can be separated into luminance and color channels (YUV colorspace). FIG. 3C shows how this visual information is processed by the neural simulation system; the luminance information can feed a set of edge detecting neuronal areas and the color information can drive neuronal areas dedicated to detecting particular game-related colors. Information from these early visual areas is combined in neuronal areas that detect game-related objects.

In one embodiment, there are five important objects on a robot sensor field with different colors or color combinations: our goal, opponent's goal, ball, teammate and opponent. The visual system can use six neuronal color groups, each of them having a preferred color, namely Red, Green, Blue, Yellow, Pink and Purple (see FIG. 3C). To speed up the mainly color-based object recognition, a tool can recognize these preferred colors by creating a lookup table for each color on the UV color space. A value in a color table can be regarded as the probability of a particular UV coordinate belonging to that specific color. Snapshots from an exemplary user interface to create a color lookup table is presented in FIG. 5.

The visual and object recognition nervous system can contain 15 neuronal areas. FIG. 3C shows a high level diagram of the system including the various neuronal areas and the arrangement of the feed forward and recurrent excitatory and inhibitory synaptic connections. The model is based on recent model of the primate visual system, where the edge and color filtering neuronal areas correspond roughly to primary visual cortices and the object recognition neuronal areas perform similar functions to inferotemporal and parietal cortices. The color and edge groups of the neuronal visual areas can be in direct and topographic connection with the preprocessed visual sensory inputs (FIG. 3C):

Each of the six color neuronal groups can have activity proportional to how close an image matches its preferred color as determined by its color lookup table. That is, activity of each cell in a color group denotes the 'closeness' of its pixel in the image to the preferred color. For example, for a picture with a red ball on a green grass, the activities of the red group can be almost everywhere approximately zero (silent) except on coordinates where the ball is.

A vertical, a horizontal, and two diagonal edge-filtered Y channel can be directly mapped on to the corresponding four edge groups. In the SS-BBD's neural model, each object the robot has to recognize on the playing field can have its own neuronal area, namely Ball, Goal, Teammate, Opponent, Opponent's Goal areas (See FIG. 3C). These object groups can receive their topographical inputs from one or more color neuronal groups.

Some objects can be detected using a single color. For example, the ball can be red, the goal can be purple, and the opponent's goal can be pink. Teams, however, can be denoted by combinations of colors: for example in one case, our team is purple and yellow on the same color marker. For these objects, the corresponding neuronal area can recognize conjunctions of these colors in the nearby topographic locations. The ball neuronal area can also recognize the ball by its shape: a conjunction of edges in a particular configuration. The object areas can have recurrent self-excitatory connections and some also had inhibitory connections to the other object areas. Inhibitory connections make the system more robust: Object groups that should not be in the same place in the visual field can have inhibitory connections to each other. To put it all together, the visual object recognition can be based on color information, tuned self-excitation, and cross inhibition between the object groups and shape information. All these together make it possible for the neural simulation to efficiently recognize objects.

Thus, and in summary, FIG. 3C illustrates a schematic neural architecture for the visual system and object detection, which has the following features: Schematic neural architecture for the visual system and object detection. 1) RGB to YUV conversion of the grabbed image. 2) Edge filtering of the Y (luminance) channel and Color Filtering in the UV domain. 3) The edge and color neuronal areas are connected with the object neuronal groups. 4) Cross/lateral excitations and recursive inhibitions help improve the object recognition. All the connections in the processing stream can be topographical. Lines with filled circles can mean inhibition, while an arrow can denote excitatory connection.

Figure 5:
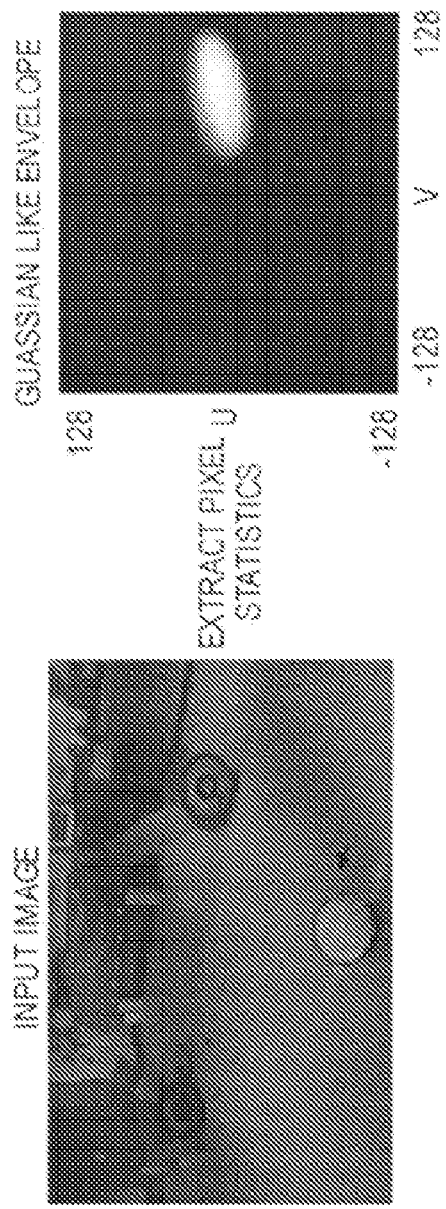
FIG. 5 shows an example of image processing for a hybrid control device.

FIG. 5 shows creating a color specific Gaussian envelope lookup table in the UV domain. The user can crop out an area of the visual field so that the cropped area consists of only the selected color (object), which is a red ball on the above example. A statistical algorithm then reads the RGB pixel values of the cropped area, converts them to YUV and, based only on the UV values, generates a Gaussian like two dimensional probability surface on the UV space. This surface can be saved and used as a lookup table for that specific color.

When humans look for an object, both head and eyes turn in the proper direction, but the eyes arrive first due to their faster movement. After the eyes have completed the saccade to the object, they enter a smooth pursuit phase and track the object as the head completes its turn, and the eyes are once more centered in the head. When the body is also involved in visual search, as in the case of traveling to a target, then the eye-head coordination is followed by the body re-centering the head.

The target tacking behavior the SS-BBD can be analogous to human behavior: a camera saccade can foveate the target object and then the body turns to follow while the camera tracks the object smoothly. The following paragraphs describe the neural mechanisms that can implement this algorithm. The activity of neuronal object areas can be organized retinotopically, and whichever one of these areas is selected to be the target object is projected retinotopically to a pan area and a tilt area. The pan area's activity therefore can reflect the horizontal distribution of activity in the target area. Activity in the pan area can drive the panning actuator in a topological fashion: more activity to the right of the area means the camera turns to the right. Thus the camera can turn to the right to re-center an object that is in the right half of the image. The tilt area can work similarly in the vertical direction. Information about the velocity of the target object can also modify the activities of the pan and tilt areas. This can allow the gaze system to track objects that are moving faster than would be possible if only positional information was used. The apparent velocity of the target object can be continuously calculated. Two slip areas (one for vertical position, one for horizontal) can have activities that represent where the target object is anticipated to be, given its current position and velocity. The horizontal slip area can project to the pan area, and the vertical slip area can project to the tilt area. The result of this architecture can be that the camera will tend to lead a moving object rather than lag it, and the body motion that follows the head will therefore have a smoother trajectory.

The activity of the pan area can, in turn, project topographically to the body motor area, which controls the rotational velocity of the SS-BBD. Off center activity in the body area can create a turn in that direction. The total system can result in a cascade of activity that comes from visual areas to the motor areas, which in turn creates a change in behavior and changes in the visual input. The smooth motion of tracking behavior can be somewhat surprising given that head-body tracking is underconstrained. But the very different time constants of camera and body motion prevent tracking behavior from being underdamped in most circumstances.

The non-neural elements of the controller (see FIG. 3A) can be organized on two levels: behaviors and plays. Behaviors can be atomic actions that the device undertakes, such as searching for an object, or kicking the ball. Each behavior can be a separate controller that sends commands to the motor neuronal areas independently of the other behaviors. In one embodiment, only one behavior can be active at any one time and can take input directly from the sensors or input preprocessed from the sensory neuronal areas. A basic play can be composed of a sequence of behaviors, and the sensory conditions that will cause the controller to transition to each new behavior. Plays can also be compositional; a more complicated play can be composed of other plays as well as behaviors. All plays can draw on the same set of possible behaviors, but be recombined in various ways to produce different results. Finally, a mechanism can exist that allows the human player to over-ride the normal autonomous execution of plays by the SS-BBD. A voice command system can be installed on the human player's Segway Scooter that wirelessly relays a command to the SS-BBD causing it to execute a new play requested by the human player.

The behaviors used by the SS-BBD can be: Find Object: Pan the camera and turn the SS-BBD in place, until a target object is visually recognized. Track Object: Approach a target object while keeping it foveated using both the pan-tilt unit and the wheels of the SS-BBD. Capture Ball: Perform the final maneuvering to get close to the ball and lower the catchers to trap it. Kick: Lift the catchers away from the ball and fire the kicking solenoids. The Kick and Capture Ball behaviors can be simple, precisely tuned controllers. Capture Ball can be a proportional controller that uses feedback from both the neuronal visual ball area and non-neural signals direct from the IR to guide the SS-BBD to the correct point to capture the ball, at which point it actuates the solenoids. Kick can be an open-loop sequence of commands to catcher solenoids, kicker solenoids, and the wheels that results in a straight, powerful kick traveling about 1.5 m/s. Both behaviors can have some error correction logic that can correct or re-start the process if the ball is not successfully kicked or captured.

The behaviors Find Object and Track Object can be set to work on any object that is detected by the neural simulation: soccer balls, either goal on the field, a teammate, or an opponent. Find Object can have two different algorithms depending on the circumstances of its execution: (1) if called during a momentary loss of an object that had been previously tracked, (2) if called for a brand new search. The first case can occur if there is any velocity information about the target object, then Find Object will use it to steer the search in the same direction in which the object was observed to travel. This velocity signal can allow Find Object to continue to follow the path of an object that has been momentarily occluded by some obstacle. Otherwise, Find Object can search in a random direction for the target object. Since the pan-tilt unit can track the camera faster than the device's body can turn, it first performs a head-check to the limits of the pan for the object. If not found, it can smoothly transition the head motion into a body motion in the same direction.

The Track Object behavior can be based on psychophysical data about eye/head-body coordination, and can be implemented using neural mechanisms. Track Object can cause the SS-BBD to move forward as well as to turn towards the target when it is not in possession of the ball (e.g., while chasing a loose ball). If it is in possession (e.g., when lining up a shot on the goal) then it can just rotate in place. When moving forward Track Object uses a planned obstacle avoidance algorithm that balances target seeking with obstacle-avoiding. When humans are faced with the task of trying to reach a desired location while avoiding obstacles along the way, their navigation behavior can be described and predicted by a simple dynamical model. The SS-BBD can use this human psychophysics model to plan routes when executing the behavior Track Object in the presence of obstacles.

The model can control angular velocity of the SS-BBD as a function of the angular heading and distance to both the target and the obstacles, where the existence of multiple obstacles can be handled by linearly combining terms for each obstacle. The heading of the agent ($\phi$), obstacle distance ($d_O$), and heading ($\psi_O$), and target distance ($d_t$) and heading ($\psi_t$) are the variables in a spring-mass type equation to determine angular velocity of the agent ($\ddot{\phi}$), $$\ddot{\phi} = 1/3(\phi - \psi_t) - \sum_{i=1}^{\#obstacles} 1980(\phi - \psi_o)e^{-3.5\|\phi - \psi_o\|}e^{-0.8d_o}$$

where the first term is a spring function governing attraction to the target object, and the second term is a function dictating repulsion from obstacles. In this equation, headings are in units of radians and distances in units of meters. There are differences between the model used by the SS-BBD and the original model meant to replicate human behavior. The human model can posses a damping term (i.e., a function of $\dot{\phi}$) whereas this exemplary embodiment does not. The attraction to the target object need not be related to the distance to the target in this model, whereas the human model can be an exponential distance term. This model responds to obstacles that are further away from the robot heading, and more strongly to those obstacles at the same deflection. The changes to the obstacle term and the removal of the damping term can be used since the SS-BBD has substantially different dynamics than a human being. The lack of distance dependency in the target object term can be used because visual information to find the target object is used, which easily provides good heading information but poor distance information without substantial image processing.

In contrast, obstacles can be detected through use of a laser rangefinder, which provides accurate distance and heading information. An obstacle can be defined as any set of adjacent laser readings subtending at least 3° of arc that are all less than two meters from the rangefinder. The values $\psi_O$ and $d_O$ for the obstacle can then be equal to the average values of those three laser readings. The 3° C. requirement provides a measure of resistance to false positive detection of obstacles. Since this device operates in a real environment with stringent safety requirements, the translational and rotational velocities of the SS-BBD are subject to additional constraints. The normal maximum forward speed of the device can be 5 m/s, but this can be reduced proportional to the average distance of all obstacles detected by the laser rangefinder. This can increase safety by reducing speed in cluttered environments. Additional safety can be provided by backing up slowly if an obstacle is less than 1m away in the front arc, as long as there are no obstacles within 1m in the back arc (as determined by rear IR sensors).

Figure 6:
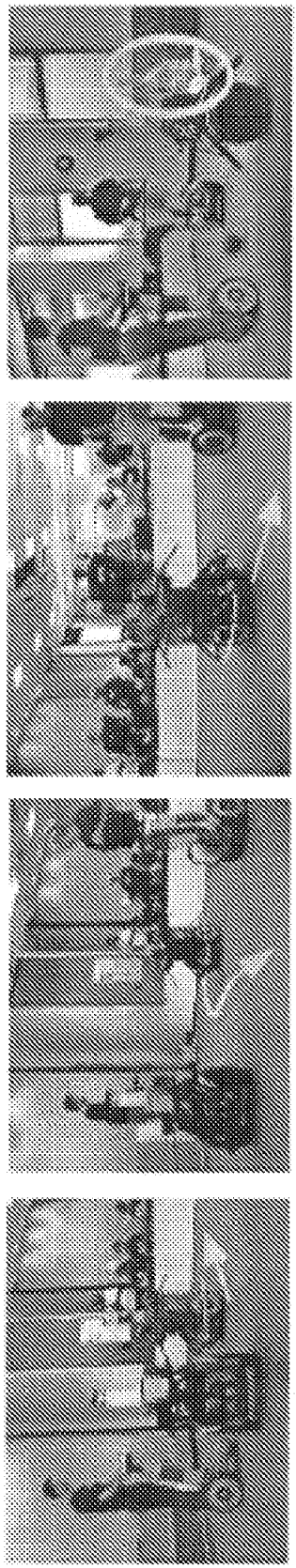
FIG. 6 shows an example of hybrid control device operation.

FIGS. 7A-C show Finite state automata showing how three basic plays can be composed of behaviors and conditional transitions between them. When Play Select is reached another play is chosen and executed. Examples of typical avoidance paths using these algorithms can be seen in FIG. 6. Plays can be a higher level of control than behaviors. Plays may be composed of behaviors or even other plays. A play can be a finite state automaton where the state is a particular behavior, action, or other play. As in all finite state automata, there are a set of conditional transitions between the states that determine the flow of control that defines the play. Most of the plays used on the SS-BBD can be at the level of very simple actions on the field, such as 'chase the ball', or 'pass to the teammate', or 'run downfield until near the goal'. FIGS. 7A-C show finite state automata that represent the basic plays Chase, Pass, and Run Downfield. In one embodiment, other basic plays in the repertoire can be Shoot (which is identical to pass, except the target is the opponent's goal), Run Upfield (identical to Run Downfield, except for the target), Follow the Teammate, Mark the Opponent, Block our Goal, and Wait (stay in place, tracking the ball, but not moving forward until the ball is near enough to capture). The SS-BBD can also possesses a number of plays that are more complicated, composed of the basic plays. One such is a simple offensive play designed to move the ball down the field. The flow of the play goes from Chase to Pass to Run Downfield. When Run Downfield is complete it can return to Chase and the sequence can repeat. Each sub-play in the sequence can transition to the next sub-play when it has finished its normal execution.

At any point the flow of control can be interrupted by a voice command from the human teammate. The Segway HT scooter ridden by the human has a voice recognition board such as a Voice Extreme™ Toolkit, Sensory, Inc., Santa Clarita, Calif., connected to a microphone that can recognize about a dozen discrete short phrases after being trained to a particular voice. These phrases can be code names for various plays in the SS-BBD's repertoire, and for each such phrase a corresponding command is transmitted wirelessly to the SS-BBD, which upon receiving the command immediately executes the correct play.

Although mimicking biology has in recent years become a well-accepted approach to building robotic systems, behavioral control at the level of systems neuroscience is of particular interest. Large-scale neural simulations of vertebrate neuroanatomy and neurophysiology can be used to test hypotheses of how real nervous systems function. It is important that such neural simulations are embodied in a real-world device interacting with a rich environment, rather than operating in abstract simulation worlds. Much of the complexity of animal behavior results from the interactions between the nervous system, the rest of the body, and the environment. A Brain-Based Device (BBD) (see Appendix) approach offers insights for designing robots that need to survive and accomplish tasks in dynamic environments with robustness and adaptability that is difficult to obtain using traditional engineering and artificial intelligence methods. The BBD method was applied to the design of the Segway Soccer robot, and produced a device that is capable of interacting with humans both cooperatively and competitively, but most importantly, safely.

In these two devices there are exemplary operating principles that describe how the neural and non-neural control elements interact with each other.

The amount of activity in a neuronal group can cause a non-neural controller to make a decision. For example, if summed activity of neuronal units in the Ball area exceeds a threshold the ball is present in the field of view, and the action selection unit may decide to chase the ball.

The location of activity in a topographically mapped neuronal group can be used by a non-neural controller as a control signal. For example, while tracking a ball, an obstacle is found in front of the SS-BBD. The center of mass of activity in the Ball area can produce an x, y value that corresponds to the ball's azimuth and heading in the visual field. The ball's heading can be used by the obstacle avoidance algorithm in conjunction with the obstacle heading to determine in what direction the SS-BBD should drive.

Non-neural controllers can create temporary connections between neuronal groups. For example, the action selection module decides that the ball should be chased. It creates a connection from the Ball group to the Head motor group, and the resulting cascade of neuronal activity causes the SS-BBD to chase the ball.

Non-neural controllers can override the motor output of the neural controllers in certain circumstances. For example, the obstacle avoidance modules can inhibit the output of the Head-Body neuronal controllers when it detects an obstacle in favor of its own motor commands.

Both neural and non-neural controllers can share the same input stream. For example, Darwin++ has the laser range data going directly into a sensory cortical area. The same data can also be processed by the localization module to determine location on a map.

A circular flow of information between neural and non-neural controllers can be established that refines an estimate. For example, in Darwin++ the localization module produces an estimate of location. This estimate in turn is one of several sensory modalities that is fed to a hippocampal complex model. Neuronal units in the CA1 area of the hippocampus have activity that is strongly tied to place; therefore the activity of these units can be used to produce new hypotheses of location for the localization model, which closes the circle.

A non-neural controller can modulate neural activity. In one version of the SS-BBD, a model was implemented where instead of having a temporary connection from the Ball group made to the Head group during ball-chasing, there was connections from all object areas to the Head group. However, the action selection module would increase the basal activity of the area that was of interest, and allow cross-inhibition between object areas to cancel out other signals to the Head motor area.

In one embodiment, the code has roughly 20,000 lines, and consists of the following major modules: Main: Infrastructure of the software; startup, shutdown, and communication between other modules (1 k lines). Display: User interface and visualization of the current state of the neural simulation (1.5 k lines). Vision: Low-level operation of the camera and image pre-processing (3 k lines). Sensors: Low-level operation of the IR sensors, compass, and laser rangefinder (2.5 k lines). Segway: Communication with the Segway Robotic Mobility Platform (800 lines). Actuators: Low-level operation of the pan-tilt unit and solenoids (700 lines). Voice: Communication with the human player's voice command module (300 lines). Simulator: The neural simulation (5 k lines). Action Selection: Non-neural algorithms that control device behavior (3 k lines). Localization: Code that uses probabilistic algorithms to estimate the location of the device in a global coordinate system (1 k lines, only in Darwin++). that is, roughly one quarter of the total code base is devoted to neural control, one sixth to non-neural control, one third to low-level sensor and actuator operations, and the remainder to infrastructure, communication, and user interfaces.

TABLE 3

Values of parameters defining properties of neuronal units
Neuronal groups in the Segway Soccer BBD.

| Description | Areas | Size | $\sigma$-fire | $\sigma$-vdep | $\omega$ | g |
|---|---|---|---|---|---|---|
| Color Visual Areas (6) | Orange, Green, Blue, Yellow, Pink, Purple | 60 × 80 | — | — | — | — |
| Edge Visual Areas (6) | Horiz, Vert, LeftDiag, RightDiag | 60 × 80 | — | — | — | — |
| Aniticipated Object Location (2) | ObjectX, ObjectY | 1 × 200 | — | — | — | — |
| Pan-tilt Position Sensing (2) | PanPos, TiltPos | 1 × 200 | — | — | — | — |
| Object Areas (5) | Ball, OurGoal, TheirGoal, Teammate, Opponent | 20 × 20 | 0.05 | 0.10 | 0.25 | 1.0 |
| Motor Areas (5) | BodyTurn, BodySpeed, PanMotor, TiltMotor | 1 × 200 | 0.10 | 0.10 | 0.0 | 1.0 |

Table 3 shows values of parameters defining properties of neuronal units in one Segway Soccer BBD. The visual, anticipated object location, and pan-tilt position areas are input areas, and their activity are created by non-neural components of the hybrid (by respectively, visual processing algorithms, mathematical transformations of object area activity, and commands sent to the pantilt unit). Object areas represent where in the visual field certain items are located. Activity in motor areas is used to generate commands to various actuators. The table indicates the number of neuronal units in each area or sub-area (Size). Neuronal units in each area have a specific threshold ($\sigma$-fire), a threshold above which voltage-dependent connections can have an effect ($\sigma$-vdep), a persistence parameter ($\omega$) and a scaling factor (g).

TABLE 4

Properties of anatomical projections and connection types in the SS-BBD.
Connections between neuronal groups in the Segway Soccer BBD.

| Projection | Arbor | p | cij(0) | type |
|---|---|---|---|---|
| Orange→Bail | [ ] 3 × 1 | 1.00 | 0.8, 1.0 | VI |
| Berl, Harte, LeftDrag, RightDrag→Bail | M 1 × 1 | 1.00 | 1.3, 1.5 | VI |
| Bail→Bail | Θ 3 × 20 | 1.00 | −5.0, 5.5 | VI |
| Bail→Terminate | [ ] 1 × 1 | 1.00 | −5.5, 5.6 | VI |
| Bail→Opponent | [ ] 3 × 1 | 0.40 | −5.5, 5.6 | VI |
| Bail→Bail | [ ] 3 × 1 | 1.00 | 0.6, 0.8 | VD |
| Purple→OurGoal | [ ] 3 × 1 | 1.00 | 0.8, 1.0 | VI |
| OurGoal→OurGoal | Θ 10 × 20 | 0.75 | −5.0, −5.5 | VI |
| OurGoal→Terminate | [ ] 1 × 1 | 1.00 | −5.5, 5.6 | VI |
| OurGoal→Opponent | [ ] 1 × 1 | 1.00 | −5.5, 5.6 | VI |
| OurGoal→OurGoal | [ ] 1 × 1 | 0.40 | 0.6, 0.8 | VD |
| Purple, Yellow→Terminate | M 1 × 1 | 1.00 | 0.8, 1.0 | VI |
| Terminate→Terminate | Θ 4 × 20 | 0.75 | −5.0, −5.5 | VI |
| Terminate→Bail | [ ] 1 × 1 | 1.00 | −5.5, 5.6 | VI |
| Terminate→OurGoal | [ ] 1 × 1 | 1.00 | −5.5, 5.6 | VI |
| Terminate→TheirGoal | [ ] 1 × 1 | 1.00 | −5.5, 5.6 | VI |

TABLE 4-continued

Properties of anatomical projections and connection types in the SS-BBD.
Connections between neuronal groups in the Segway Soccer BBD.

| Projection | Arbor | p | cij(0) | type |
|---|---|---|---|---|
| Terminate→Terminate | [ ] 3 × 1 | 0.40 | 0.6, 0.8 | VD |
| Pink, Blue→Opponent | M 1 × 1 | 1.00 | 0.8, 1.0 | VI |
| Opponent→Opponent | Θ 4 × 20 | 0.75 | −5.0, 5.5 | VI |
| Opponent→Bail | [ ] 1 × 1 | 1.00 | −5.5, 5.6 | VI |
| Opponent→OurGoal | [ ] 3 × 1 | 1.00 | −5.5, 5.6 | VI |
| Opponent→TheirGoal | [ ] 3 × 1 | 1.00 | −5.5, 5.6 | VI |
| Terminate→Terminate | [ ] 3 × 1 | 0.40 | 0.6, 0.8 | VD |
| Pink→TheirGoal | [ ] 3 × 1 | 1.00 | 0.8, 1.0 | VI |
| TheirGoal→TheirGoal | Θ 10 × 20 | 0.75 | −5.0, 5.5 | VI |
| TheirGoal→Terminate | [ ] 3 × 1 | 1.00 | −5.5, 5.6 | VI |
| TheirGoal→Opponent | [ ] 3 × 1 | 1.00 | −5.5, 5.6 | VI |
| TheirGoal→TheirGoal | [ ] 3 × 1 | 0.40 | 0.6, 0.8 | VD |
| Object_X→PanMotor | [ ] 3 × 1 | 1.00 | 0.30, 0.40 | VI |
| Object_Y→TiltMotor | [ ] 3 × 1 | 1.00 | 0.30, 0.40 | VI |
| PanPos→BodyTurn | [ ] 3 × 1 | 0.25 | 0.03, 0.08 | VI |
| TiltPos→BodySpeed | [ ] 3 × 1 | 0.25 | 0.03, 0.04 | VI |

Table 4 shows an example of properties of anatomical projections and connection types in a SS-BBD of one embodiment. A presynaptic neuronal unit connects to a postsynaptic neuronal unit with a given probability (p) and given projection shape (Arbor). This arborization shape can be rectangular "[]"with a height and width (h×w), doughnut shaped or a ring of lateral connections "Θ" with the size of the ring constrained by an inner and outer radius (r1, r2), or non-topographical "non-topo" where any pairs of presynaptic and postsynaptic neuronal units have a given probability of being connected. The matching arborization "M" denotes a logical AND topographical projection from all pre-synaptic groups to the post-synaptic group. The initial connection strengths, cij(0), are set randomly, with a uniform distribution, within the range given by a minimum and maximum value (min, max). A negative value for cij(0), indicates inhibitory connections. Connections marked with "intra" denote those within a visual sub-area and connections marked with "inter" denote those between visual sub-areas. Projections marked # are positive value-dependent; they use the S+ area for TD learning. Projections marked * are negative value-dependent and use the S− area for TD learning. A connection type can be voltage-independent (VI), or voltage-dependent (VD). φ denotes the persistence of the connection. Non-zero values for η, k1 and k2 signify plastic connections.

Functions of the hybrid control device, such as those represented in the Figures and Tables above can be implemented using software (also called control logic) executing in computer(s) each having one or more processors. The software, when executed, causes the processors to perform the functions described herein. In embodiments, such software is stored in computer useable mediums (such as, but not limited to, magnetic or optical storage mediums, carrier waves, etc.) of computer program products (such as, but not limited to, RAM, ROM, CDs, DVDs, hard drives, memory sticks, electrical signals over the Internet, etc.).

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its partial application, thereby enabling others skilled in the art to understand the invention for various embodiments and with various modifications that are suited to the particular use contemplated. For example, the features and functions described herein are applicable to other applications in addition to a hybrid device capable of playing soccer. It is intended that the scopes of the invention are defined by the claims and their equivalents.

APPENDIX

A brain-based device (BBD) can be able to adapt to varying terrain by learning which aspects of the terrain it can traverse and which aspects it must circumvent. The BBD can make decisions on aspects of the environment that go beyond map-making of prior robotic systems. These decisions can require perceptual categorization of local object features, which the BBD of the present invention makes, thereby enabling the BBD to plot a course.

The BBD of the present invention can include a neuronal control portion including a simulated nervous system having neural areas, in one embodiment, the hippocampus, the parietal cortex, the inferotemporal cortex, and a thalamic head direction system, The bi-directional connectivity between the hippocampus and these regions (see Diagram 1A), as well as the intricate connectivity within the hippocampus (see Diagram 1B), can comprise a system that loops multimodal information over time and allows the formation of associative memories with a temporal context. The BBD also has a mobility base enabling it to move about in a real world environment under control of the simulated nervous system, together with a multi-sensor input enabling the BBD to recognize objects and select an action that has value consequences.

Figure 8A:
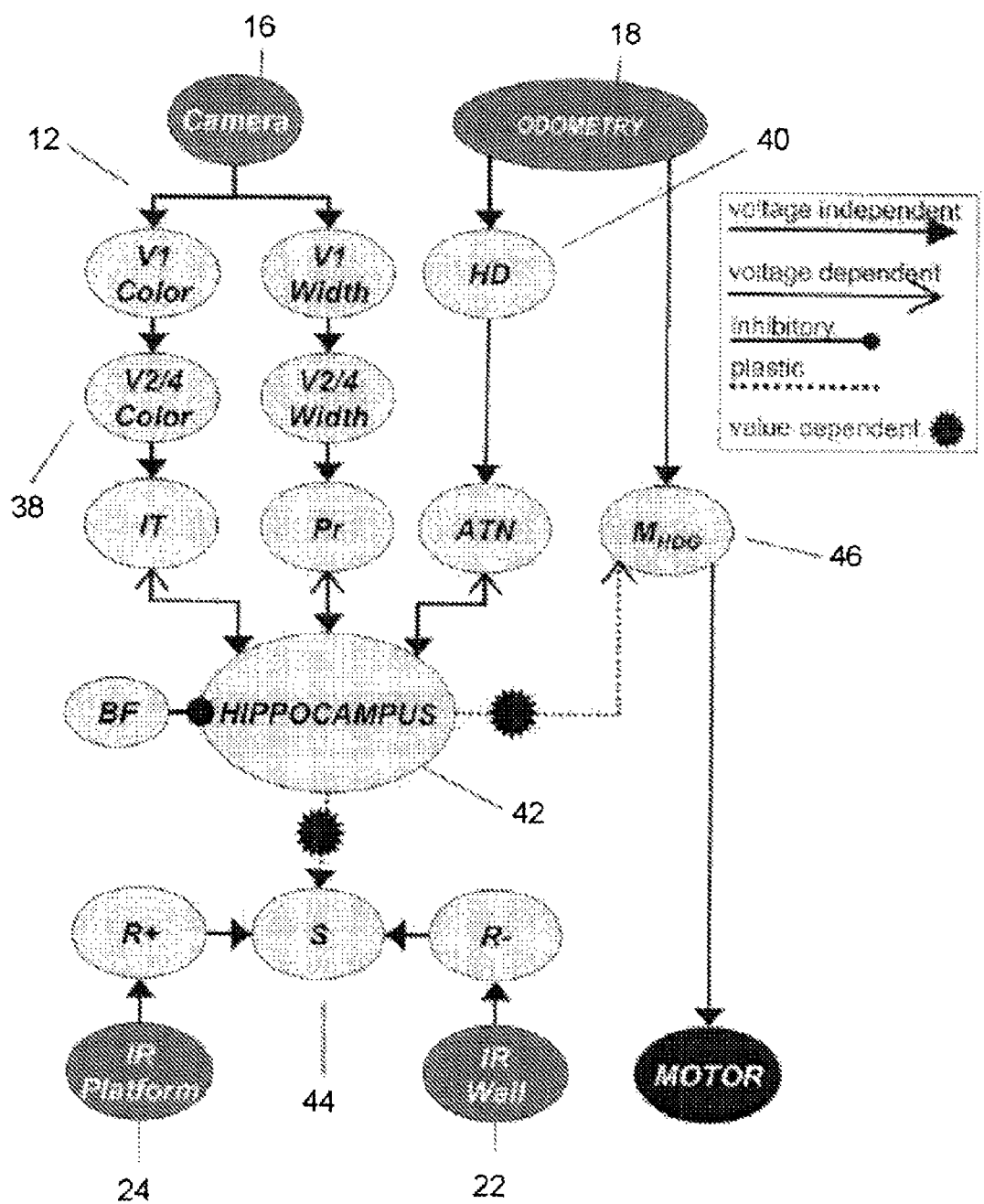
FIG. 8A shows a neuronal control portion that can be modified by adding connections to a non-neuronal control portion.

FIGS. 8A and 8B show examples of a neuronal control portion that can be modified by adding connections to a non-neuronal control portion.

FIG. 8A is a schematic of the regional and functional neuroanatomy of a neuronal controller portion 12 of one embodiment, which includes the intricate anatomy and physiology of the hippocampus and its surrounding regions. This neuronal controller portion 12 can integrate spatial signals from numerous objects in time and provide flexible navigation solutions to aid in the exploration of unknown environments. By simultaneously sampling from its neural regions during a navigation task, the architecture of the hippocampus, as described more fully below, provides a means to organize multi-modal information over different timescales which is important for the development of spatial and episodic memories.

The neuronal controller portion 12, as shown in FIG. 8A, is modeled on the anatomy and physiology of the mammalian nervous system but, as can be appreciated, with far fewer neurons and a much less complex architecture. The neuronal control portion 12 includes a number of neural areas labeled according to the analogous cortical and subcortical regions of the human brain. Thus, FIG. 8A shows respective neural areas labeled as V1 Color, V2/4 Color, IT, V1 Width, V2/4 Width, Pr, HD, ATN, BF, Hippocampus, R+, S, R−, and $M_{HDG}$. Each neural area V1Color, V2/4 Color, etc. can contain different types of neuronal units, each of which can represent a local population of neurons. Each ellipse shown in Diagram 1A denotes a different neural area, with each such area having many neuronal units. To distinguish modeled or simulated neural areas from corresponding regions in the mammalian nervous system, the simulated areas are indicated in italics, e.g. IT.

The neuroanatomy of FIG. 8A also shows schematically the neuronal controller portion 12 connectivity via various projections P (see arrows in FIG. 8A) of one embodiment. A projection P can contain multiple synaptic connections between neuronal units. A synaptic connection can allow a signal to be sent from a pre-synaptic neuronal unit to a post-synaptic neuronal unit. Projections P can be either within a neural area or between neural areas. Furthermore, projections P can have properties as indicated by the legend in FIG. 8A, which are (1) "voltage independent", (2) "voltage dependent", (3) "plastic", (4) "inhibitory,"and (5) "value dependent" and will be described in detail below.

Input to the simulated neural system 12 can come from the CCD camera 16, wheel odometry 18, and IR sensors 22, 24 for detection of walls and hidden platform of a real-world environment. The neural areas of simulated neural system 12 can be analogous to the visual cortex (V1, V2/4), the inferotemporal cortex (IT), parietal cortex (Pr), head direction cells (HD), anterior thalamic nuclei (ATN), motor areas for egocentric heading ($M_{HDG}$), a value system (S), and positive and negative reward areas (R+, R−). The hippocampus can be connected with the three major sensor input streams (IT, Pr, ATN), the motor system ($M_{HDG}$), and the value system (S). For clarity, the intrinsic connections within each of the neural areas are omitted from FIG. 8A.

Diagram 1B shows the detailed connectivity within the hippocampal region. The modeled hippocampus can contain areas analogous to entorhinal cortex (ECIN, ECOUT), dentate gyrus (DG), the CA3 subfield, and the CA1 subfield. These areas can contain interneurons that cause feedback inhibition (e.g. CA3→CA3FB→CA3), feedforward inhibition (e.g. DG→CA3FF→CA3), and rhythmic inhibition (e.g. BF→Hippocampus).

Much more detail of the simulated nervous system 12 is given in Table 1 and Table 2 described below. But overall, in one version of the simulated nervous system 12, there are a total of 50 neuronal areas, 90,000 neuronal units within the 50 neuronal areas, and approximately 1.4 million synaptic connections.

The neuronal controller portion 12 shown in FIG. 8A can be comprised of five systems: (1) a visual system 38, (2) a head direction system 40, (3) a hippocampus formation 42, (4) a value system 44, and (5) an action selection system 46.

FIG. 8A. Visual System 38.

The visual system 38 can be modeled on the primate occipitotemporal or ventral cortical pathway and a dorsal cortical pathway. The ventral cortical pathway shown in FIG. 8A, in the visual system (V1_color→V2/4_color→IT), can contain neuronal units in successive areas having progressively larger receptive fields until, in inferotemporal cortex (IT), receptive fields cover the entire visual field and have no topography. The dorsal cortical pathway shown in FIG. 8A (V1_width→V2/4_width→Pr) can contain neuronal units that respond to the size and position of objects.

Visual images from the CCD camera 16 can be filtered for color and edges and the filtered output directly affects neural activity in area V1-Color and V1-Width. The CCD camera 16 can send, for example, 320×240 pixel RGB video images, via an RF transmitter on NOMAD 10, to a frame grabber attached to one of the computer workstations (described below) running the neural simulation. The image can be spatially averaged to produce an 80×60 pixel image. Different sized Gabor filters (8×8, 16×16, 32×32, and 64×64) can be used to detect vertical edges of varying widths. The output of the Gabor function can map directly onto the neuronal units of the corresponding V1 width sub-areas (V1-width8, V1-width16, V1-width32, and V1-width64) (not shown in FIG. 8A). Color filters (e.g., red positive center with a green negative surround, red negative center with a green positive surround, blue positive with red-green negative, and blue negative with red-green positive) may be applied to the image. The outputs of the color filters can be mapped directly onto the neuronal units of V1 Color sub-areas V1-red, V1-green, V1-blue, and V1-yellow (not shown in FIG. 8A). V1 neuronal units project retinotopically to neuronal units in V2/V4.

FIG. 8A. Head Direction System 40.

Neurons in the areas HD are often called "head direction" cells. Information obtained from the wheels of the SS-BBD (see FIG. 4) can be used to estimate the current heading of the SS-BBD. This information is input into the head direction neural area (HD). Each of the 360 HD neuronal units (see Table 1) can have a cosine tuning curve, which responds maximally to a preferred heading with a tuning width of π radians:

$$\cos(HD_i - \text{curr\_heading}); \qquad 1.$$

where $HD_i$ is a head direction cell with a preferred direction of $$\left(\frac{i}{360} 2\pi\right),$$

i ranges from 0 to 359, and curr_heading is SS-BBD's heading, which is calculated from odometer information.

The head direction cells can project topographically to an area analogous to the anterior thalamic nucleus (see HD→ATN in Table 2 and FIG. 8A) and to a motor area based on heading (see HD→$M_{HDG}$ in Table 2 and FIG. 8A—note, this path not in FIG. 8A). A new heading for the SS-BBD can be chosen based on the activity in neuronal area $M_{HDG}$ (see FIG. 8A—Action Selection, below, for further details).

Hippocampal Formation—Neural Area Hippocampus 42.

The architecture of the simulated hippocampal formation can be based on rodent neuroanatomy. The input streams into the hippocampus can be from the associative cortical areas in the simulated nervous system and arrive at the hippocampus via the entorhinal cortex 2 (see ATN→$EC_{IN}$, IT→$EC_{IN}$, Pr→$EC_{IN}$ in Table 2). The perforant path can project mainly from entorhinal cortex to the dentate gyrus but also to the CA3 and CA1 subfields (see $EC_{IN}$→DG $EC_{IN}$→CA3, $EC_{IN}$→CA1 in Table 2 and FIG. 8B). The mossy fibers (see DG→CA3 in Table 2 and FIG. 8B), Schaffer collaterals (see CA3→CA1 in Table 2 and FIG. 8B), and divergent projections from the hippocampus back to the cortex (see CA1→$EC_{OUT}$→ATN, IT,Pr) in Table 2 ) can also be present in the simulated nervous system 12. The prevalent recurrent connectivity found in the hippocampal formation can also be included in the simulated nervous system 12 (see $EC_{IN}$→$EC_{OUT}$ DG→DG, and CA3→CA3 in Table 2 and FIG. 8B). All of the connections within the hippocampus proper (i.e., $EC_{IN}$, $EC_{OUT}$, DG, CA3, CA1) can be value-independent and plastic (see section Synaptic Plasticity, below).

Unique patterns of intrinsic and extrinsic, feedback and feedforward inhibitory connections in the hippocampus can play an important role in hippocampus processing. Consequently, the neuronal controller portion 12 can include feedback inhibitory connections (see EC→$EC_{FB}$→EC, DG→$DG_{FB}$→DG, CA3→$CA3_{FB}$→CA3, CA1→$CA1_{FB}$→CA1 in Table 2 and FIG. 8B) and feedforward inhibitory connections (see DG→$CA3_{FF}$→CA3, CA3→$CA1_{FF}$→CA1 in Table 2 and FIG. 8B). These connections can be useful for separating inputs and network stability.

Basal Forebrain and Theta Rhythm (Table 2).

The simulated basal forebrain (BE) can provide an extrinsic theta rhythm for the neural simulation. The function of the simulated basal forebrain area can be to gate input into the hippocampus and keep activity levels stable. The BF area can have a rhythmic activity over 13 simulation cycles:

$$BF(t) = \text{theta}(t \bmod 13);$$

where theta={0.01, 0.165, 0.33, 0.495, 0.66, 0.825, 1.00, 0.825, 0.66, 0.495, 0.33, 0.165, 0.01}. BF can project to all hippocampal areas with inhibitory connections (see BF→$EC_{IN}$,$EC_{OUT}$,DG,CA3,CA1 in Table 2). The level of inhibition, which is adaptive, can keep the activity in hippocampal regions within specific ranges:

$$\Delta sf_r(t) = (s_r(t) - tgt_r)$$

$$BF_r(t) = BF(t) + sf_r(t);$$

where r denotes the region (i.e. $EC_{IN}$, $EC_{OUT}$, DG, CA3, CA1), $sf_r(t)$ is the scale factor at time t, $s_r(t)$ is the percentage of active neuronal units in region r at time t, $tgt_r$ is the desired percentage of active units in area r ($EC_{IN}$=10%, $EC_{OUT}$=10%, DG=20%, CA3=5%, and CA1=10%), and $BF_r(t)$ is the presynaptic neuronal unit activity for a BF to hippocampus region r connection.

FIG. 8A. Value Systems and Temporal Difference Learning 44.

Activity in the simulated value systems 44 can signal the occurrence of salient sensory events experienced by the SS-BBD and this activity contributes to the modulation of connection strengths in the pathways shown. Initially, value system S can be activated by the IR detector 24 that detects a hidden platform (see $R^+$→S in Table 2 and FIG. 8A), causing potentiation of value dependent connections (CA1→S and CA1→$M_{HDG}$), or by obstacle avoidance the IR detectors 22 (see $R^-$→S in Table 2 and FIG. 8A), causing depression of value dependent connections. After learning, pursuant to the training trials mentioned above and described more fully below, the area CA1 can have an effect on area S activity. The magnitude of potentiation or depression can be based on a neural implementation of a temporal difference (TD) learning rule:

$$TD(t) = \begin{cases} R^+(t) - \overline{S(t-\tau)}; & R^+ > 0 \\ \overline{S(t-\tau)} - R^-(t); & R^- > 0 \\ \overline{S(t)} - \overline{S(t-\tau)}; & \text{otherwise} \end{cases}$$

where $\overline{S(t)}$ is the average activity of the value system S at time t, τ is one theta cycle or 13 simulation cycles, $R^+$ is a positive reward and equal to 1 if the downward facing IR detector 24 is triggered, meaning that SS-BBD is over the hidden platform, and $R^-$ is a penalty and equal to 1 if one of the seven IR detectors 22 around the SS-BBD's base is triggered, meaning that the SS-BBD is too close to a wall. The basic idea of the temporal difference TD rule can be that the learning is based on the difference between temporally successive predictions of rewards. In other words, the goal of the learning can be to make the learner's current prediction for the current input pattern more closely match the next prediction at the next time interval (τ). If the predicted value increases, TD is positive and affected synaptic connections of the simulated nervous system 12 are potentiated, and if the predicted value decreases TD is negative and affected synaptic connections are depressed. After some experience, values can increase as the SS-BBD heads toward the platform 36 and thus reinforce movements towards the platform 36. Alternatively, values can decrease as the SS-BBD nears obstacles, and thus reinforce movements away from walls 30 and other obstacles. Further details on how the temporal difference is applied to individual synaptic connections are given below when describing Synaptic Plasticity.

FIG. 8A. Action Selection and Exploratory Behavior 46.

The SS-BBD can move forward for 3 theta cycles (39 simulation cycles) and then selects a new heading, as described below. If the SS-BBD detects an obstacle, it may reverse its direction for 24 inches, and then turn away from the IR sensor 22 that detected the obstacle. If the SS-BBD detects a hidden platform, it may turn counter-clockwise 60 degrees and wait for 3 seconds, then turn clockwise for 60 degrees and wait 3 seconds, then another 60 degree clockwise turn and 3 second wait, and finally turn counter-clockwise returning to its original heading, all under control of system 12. The simulation ends at this point, and the current state of the simulated nervous system 12 is saved to hard disk. Otherwise, after 3 theta cycles, the SS-BBD may choose a new heading based on activity in the motor area ($M_{HDG}$) of the simulated nervous system 12. From its original heading, the SS-BBD may first turn counter-clockwise 60 degrees and wait for 3 seconds, then turn clockwise for 60 degrees and wait 3 seconds, then another 60 degree clockwise turn and 3 second wait, and finally turn counter-clockwise returning to its original heading, all under control of system 12. The average activity of $M_{HDG}$ is calculated during the wait periods. A softmax algorithm may be used to create a probability distribution for choosing a new heading based on the following equation:

$$p(newhdg) = \frac{\exp(40(\overline{M_{HDG}(newhdg)}))}{\sum_{h=hdg-60,hdg,hdg+60} \exp(40(\overline{M_{HDG}(h)}))};$$

where newhdg is a possible new heading for the SS-BBD, $M_{HDG}$ (newhdg) is the average activity of $M_{HDG}$ at a possible new heading, hdg is the current heading, and h has three positions (current heading, current heading less 60 degrees, current heading plus 60 degrees). After the simulated nervous system 12 can select a new heading, the SS-BBD would be oriented to the new heading and then proceed forward for another 3 theta cycles before activating the heading selection process again.

NEURONAL UNITS/DYNAMICS—GENERALLY.

A neuronal unit within a neural area V1 Color, V1 Width etc. can be simulated by a mean firing rate model. The state of each unit can be determined by a mean firing rate variable (s). The mean firing rate variable of each unit corresponds to the average activity or firing rate variable of a group of roughly 100 neurons during a time period of approximately 200 milliseconds.

Synaptic connections between neural units, both within and between neuronal areas V1 Color, V1 Width, etc. can be set to be either voltage-independent or voltage-dependent, and either plastic or non-plastic. Voltage-independent connections can provide synaptic input to a postsynaptic neuron regardless of post synaptic state of the neuron. Voltage-dependent connections can represent the contribution of receptor types (e.g. NMDA receptors) that require postsynaptic depolarization to be activated.

In other words, a presynaptic neuron can send a signal along its axon through a synapse to a post synaptic neuron. The postsynaptic neuron can receive this signal and integrate it with other signals being received from other presynaptic neurons.

A voltage independent connection can be such that if a presynaptic neuron is firing at a high rate, then a post-synaptic neuron connected to it via the synapse will fire at a high rate.

A voltage dependent connection can be different. If the postsynaptic neuron is already firing at some rate when it receives a presynaptic input signal, then the voltage-dependent connection can cause the post synaptic neuron to fire more. Since the postsynaptic neuron can be active, i.e. already firing, this neuron is at some threshold level when receiving the input signal. Therefore, this presynaptic connection can modulate the post synaptic neuron to fire even more. The voltage-dependent connection, no matter how active the presynaptic neuron is, may have no effect on the postsynaptic neuron if the latter were not above the threshold value. Thus, the postsynaptic neuron can have some given threshold of activity to be responsive or modulated by a voltage-dependent synaptic connection.

Neuronal Units.

The mean firing rate (s) of each neuronal unit can range continuously from 0 (quiescent) to 1 (maximal firing). The state of a neuronal unit can be updated as a function of its current state and contributions from voltage-independent, and voltage-dependent inputs. The voltage-independent input to unit i from unit j can be:

$$A_{ij}^{VI}(t) = c_{ij}s_j(t);$$

where $s_j(t)$ is the activity of unit j, and $c_{ij}$ is the connection strength from unit j to unit i. The voltage-independent postsynaptic influence, $POST_i^{VI}$, on unit i can be calculated by summing over all the inputs onto unit i:

$$POST_i^{VI}(t) = \varphi(POST_i^{VI}(t-1)) + (1-\varphi)\left(\sum_{l=1}^{M}\sum_{j=1}^{N_i}(A_{ij}^{VI}(t))\right);$$

where M is the number of different anatomically defined connection types (see Table 2), $N_i$ is the number of connections of type M projecting to unit i, and $\varphi$ is the persistence of synaptic input.

The voltage-dependent input to unit i from unit j can be:

$$A_{ij}^{VD}(t) = \Phi(POST_i^{VD}(t))c_{ij}s_j(t),$$

where $$\Phi(x) = \begin{cases} 0; & x < \sigma_i^{vdep} \\ x; & \text{otherwise} \end{cases};$$

where $\sigma_i^{vdep}$ is a threshold for the postsynaptic activity below which voltage-dependent connections have no effect (see Table 1).

The voltage-dependent postsynaptic influence on unit i, $POST_i^{VD}$, can be given by:

$$POST_i^{VD}(t) = \varphi(POST_i^{VD}(t-1)) + (1-\varphi)\left(\sum_{l=1}^{M}\sum_{j=1}^{N_i}(A_{ij}^{VD}(t))\right);$$

A new activity, $s_i(t+1)$, can be chosen based on the sum of the postsynaptic influences on neuronal unit i:

$$POST_i = \sum_{j=1}^{N_{VI}} POST_j^{VI} + \sum_{k=1}^{N_{VD}} POST_k^{VD}$$

The new activity for the neuronal unit is the activity level at the newly chosen phase, which can then be subjected to the following activation function:

$$s_i(t+1) = \phi(\tanh(g_i(POST_i + \omega s_i(t)))),$$

where $$\phi(x) = \begin{cases} 0; & x < \sigma_i^{fire} \\ x; & \text{otherwise} \end{cases};$$

where $\omega$ determines the persistence of unit activity from one cycle to the next, $g_i$ is a scaling factor, and $\sigma_i^{fire}$ is a unit specific firing threshold.

Specific parameter values for neuronal units are given in Table 1:

Table 1—Parameter Values. Specific values of parameters defining properties of the example neuronal units of one embodiment are given in Table 1.

TABLE 1

Parameter Values. Specific values of parameters defining properties of the example neuronal units of one embodiment are given in Table 1.

| Area | Size | σ-fire | σ-vdep | ω | g |
|---|---|---|---|---|---|
| V1 (8) | 60 × 80 | — | — | — | — |
| HD | 1 × 360 | — | — | — | — |
| R+ | 1 × 1 | — | — | — | — |
| R− | 1 × 1 | — | — | — | — |
| BF | 1 × 1 | — | — | — | — |
| V2/4-color (4) | 6 × 8 | 0.20 | 0.10 | 0.0 | 1.0 |
| V2/4-width (4) | 15 × 20 | 0.20 | 0.10 | 0.0 | 1.0 |
| IT | 30 × 30 | 0.20 | 0.10 | 0.0 | 1.0 |
| ITi | 15 × 15 | 0.20 | 0.10 | 0.15 | 1.0 |
| PR | 30 × 30 | 0.20 | 0.10 | 0.0 | 1.0 |
| ATN | 30 × 30 | 0.10 | 0.10 | 0.50 | 1.0 |
| ATNi | 30 × 30 | 0.10 | 0.10 | 0.15 | 1.0 |
| $M_{HDG}$ | 1 × 60 | 0.0 | 0.10 | 0.0 | 1.0 |
| $M_{HDG}i$ | 1 × 60 | 0.0 | 0.10 | 0.0 | 1.0 |
| S | 4 × 4 | 0.0 | 0.10 | 0.0 | 1.0 |
| $EC_{IN}$ | 30 × 30 | 0.10 | 0.10 | 0.50 | 1.0 |
| $EC_{IN}i$ | 15 × 15 | 0.02 | 0.10 | 0.0 | 1.0 |
| $EC_{OUT}$ | 30 × 30 | 0.10 | 0.10 | 0.50 | 1.0 |
| $EC_{OUT}i$ | 15 × 15 | 0.02 | 0.10 | 0.0 | 1.0 |
| DG | 30 × 30 | 0.10 | 0.10 | 0.50 | 0.75 |
| $DG_{FB}i$ | 15 × 15 | 0.02 | 0.10 | 0.0 | 1.0 |
| CA3 | 15 × 15 | 0.05 | 0.10 | 0.50 | 0.75 |
| $CA3_{FB}i$ | 8 × 8 | 0.02 | 0.10 | 0.0 | 1.0 |
| $CA3_{FF}i$ | 15 × 15 | 0.02 | 0.10 | 0.0 | 1.0 |
| CA1 | 20 × 20 | 0.05 | 0.10 | 0.50 | 0.75 |
| $CA1_{FB}i$ | 10 × 10 | 0.02 | 0.10 | 0.0 | 1.0 |
| $CA1_{FF}i$ | 10 × 10 | 0.02 | 0.10 | 0.0 | 1.0 |

As shown in Table 1, areas V1, HD, R+, R−, and BF are input areas and their activity can be based on the camera image, odometry, and IR sensors respectively. Areas V1 and V2/V4 can have 4 sub-areas for color (red, green, blue, and yellow) and 4 sub-areas for varying widths consistent with the example of the enclosed environment 28 in which NOMAD 10 navigates. Table 1 indicates the number of neuronal units in each area or sub-area (Size). Neuronal units in each area have a specific firing threshold (σ-fire), and a threshold above which voltage-dependent connections can have an effect (σ-vdep), a persistence parameter (ω), and a scaling factor (g).

Synaptic connections for the neuronal units can be given in Table 2:

TABLE 2

Properties of Anatomical Projections. Specific properties of anatomical projections and connection types of the simulated nervous system are given in Table 2.

| Projection | Arbor | p | $c_{ij}(0)$ | type | φ | η | k1 | k2 |
|---|---|---|---|---|---|---|---|---|
| V1-color→V2/4-color | [ ] 1 × 1 | 1.00 | 003, 0.050 | VI | — | 0.00 | 0.00 | 0.00 |
| V2/4-color→V2/4-color(intra) | [ ] 2 × 2 | 0.40 | 0.5, 0.6 | VD | — | 0.00 | 0.00 | 0.00 |
| V2/4-color→V2/4-color(inter) | [ ] 3 × 3 | 1.00 | −0.0012, −0.28 | VI | — | 0.00 | 0.00 | 0.00 |
| V1-width→V2/4-width | [ ] 1 × 1, 2 × 2, 3 × 3, 4 × 4 | 1.00 | 0.008, 0.009 | VI | — | 0.00 | 0.00 | 0.00 |
| V2/4-width→V2/4-width(intra) | [ ] 2 × 2 | 0.40 | 0.5, 0.6 | VD | — | — | — | — |
| V2/4-width→V2/4-width(inter) | [ ] 3 × 3 | 1.00 | −0.012, −0.014 | VI | — | — | — | — |
| V2/V4→IT | non-topo | 0.05 | 0.03, 0.04 | VI | — | — | — | — |
| IT→IT | [ ] 1 × 1 | 1.00 | 0.08, 0.14 | VI | — | — | — | — |
| IT→ITi | Θ 2, 3 | 1.00 | 0.06, 0.08 | VI | — | — | — | — |
| ITi→IT | [ ] 1 × 1 | 1.00 | −0.36, −0.50 | VI | — | — | — | — |
| V2/V4→Pr | [ ] 1 × 1 | 0.25 | 0.25, 0.30 | VD | — | — | — | — |
| Pr→Pr | Θ 4, 6 | 1.00 | −0.06, −0.08 | VI | — | — | — | — |
| HD→ATN | [ ] 30 × 2 | 0.20 | 0.01, 0.02 | VI | — | — | — | — |
| ATN→ATNi | Θ 10, 15 | 0.25 | 0.01, 0.02 | VI | — | — | — | — |
| ATNi→ATN | [ ] 1 × 1 | 1.00 | −0.36, −0.50 | VI | — | — | — | — |
| HD→$M_{HDG}$ | [ ] 1 × 1 | 1.00 | 0.01, 0.01 | VI | — | — | — | — |
| $M_{HDG}$ → $M_{HDG}i$ | Θ 20, 30 | 0.50 | 0.10, 0.20 | VI | — | — | — | — |
| $M_{HDG}i$ → $M_{HDG}$ | [ ] 1 × 1 | 1.00 | −0.36, −0.50 | VI | — | — | — | — |
| ATN→$EC_{IN}$ | non-topo | 0.001 | 0.40, 0.50 | VI | — | — | — | — |
| IT→$EC_{IN}$ | non-topo | 0.001 | 0.40, 0.50 | VI | — | — | — | — |
| Pr→$EC_{IN}$ | non-topo | 0.001 | 0.40, 0.50 | VI | — | — | — | — |
| $EC_{IN}$→$EC_{OUT}$ | non-topo | 0.05 | 0.40, 0.80 | VI | — | — | — | — |
| $EC_{IN}$→$EC_{IN}i$ | Θ 2, 3 | 0.10 | 0.45, 0.60 | VI | — | — | — | — |
| $EC_{IN}i$→$EC_{IN}$ | [ ] 1 × 1 | 1.00 | −1.90, −1.20 | VI | — | — | — | — |
| $EC_{IN}$→DG | [ ] 3 × 3 | 0.10 | 0.45, 0.60 | VI | 0.75 | 0.05 | 0.90 | 0.45 |
| $EC_{IN}$→CA3 | [ ] 3 × 3 | 0.05 | 0.15, 0.20 | VI | 0.75 | 0.05 | 0.90 | 0.45 |
| $EC_{IN}$→CA1 | [ ] 3 × 3 | 0.04 | 0.30, 0.40 | VI | 0.75 | 0.05 | 0.90 | 0.45 |
| $EC_{OUT}$→ATN | non-topo | 0.01 | 0.40, 0.45 | VD | — | — | — | — |
| $EC_{OUT}$→IT | non-topo | 0.01 | 0.40, 0.45 | VD | — | — | — | — |
| $EC_{OUT}$→Pr | non-topo | 0.01 | 0.40, 0.45 | VD | — | — | — | — |
| $EC_{OUT}$→$EC_{IN}$ | non-topo | 0.05 | 0.04, 0.08 | VI | — | — | — | — |
| $EC_{OUT}$→$EC_{OUT}i$ | Θ 2, 3 | 0.10 | 0.45, 0.60 | VI | — | — | — | — |
| $EC_{OUT}i$→$EC_{OUT}$ | [ ] 1 × 1 | 1.00 | −0.90, −1.20 | VI | — | — | — | — |
| DG→CA3 | [ ] 3 × 3 | 0.03 | 0.45, 0.60 | VI | — | — | — | — |
| DG→$DG_{FB}i$ | Θ 2, 3 | 0.10 | 0.45, 0.60 | VI | — | — | — | — |
| $DG_{FB}i$→DG | [ ] 1 × 1 | 1.00 | −0.90, −1.20 | VI | — | — | — | — |
| DG→$CA3_{FP}i$ | Θ 2, 3 | 0.10 | 0.45, 0.60 | VI | — | — | — | — |
| $CA3_{FP}i$→CA3 | [ ] 1 × 1 | 1.00 | −0.90, −1.20 | VI | — | — | — | — |
| CA3→CA1 | [ ] 3 × 3 | 0.08 | 0.45, 0.60 | VI | 0.75 | 0.05 | 0.90 | 0.45 |

TABLE 2-continued

Properties of Anatomical Projections. Specific properties of anatomical projections and connection types of the simulated nervous system are given in Table 2.

| Projection | Arbor | p | $c_{ij}(0)$ | type | ϕ | η | k1 | k2 |
|---|---|---|---|---|---|---|---|---|
| CA3→CA3 | non-topo | 0.10 | 0.15, 0.20 | VI | 0.75 | 0.05 | 0.90 | 0.45 |
| CA3→CA3$_{FB}$i | ⊖ 2, 3 | 0.10 | 0.45, 0.60 | VI | — | — | — | — |
| CA3$_{FB}$i→CA3 | [ ] 1 × 1 | 1.00 | −0.90, −1.20 | VI | — | — | — | — |
| CA3→CA1$_{FP}$i | ⊖ 2, 3 | 0.10 | 0.45, 0.60 | VI | — | — | — | — |
| CA1$_{FP}$i→CA1 | [ ] 1 × 1 | 1.00 | −0.90, −1.20 | VI | — | — | — | — |
| CA1→EC$_{OUT}$ | [ ] 3 × 3 | 0.25 | 0.60, 0.75 | VI | 0.75 | 0.05 | 0.90 | 0.45 |
| CA1→M$_{4DG}$# | [ ] 3 × 3 | 1.00 | 0.01, 0.02 | VD | — | 0.05 | 0.90 | 0.45 |
| CA1→S* | [ ] 3 × 3 | 1.00 | 0.01, 0.02 | VD | — | 0.005 | 0.90 | 0.45 |
| R+→S | non-topo | 1.00 | 0.25, 0.25 | VI | — | — | — | — |
| R−→S | non-topo | 1.00 | 0.25, 0.25 | VI | — | — | — | — |
| BF→ EC$_{IN}$EC$_{OUT}$DG, CA3, CA1 | non-topo | 0.05 | −0.01, −0.02 | VI | — | — | — | — |

As indicated in Table 2, a presynaptic neuronal unit can connect to a postsynaptic neuronal unit with a given probability (p) and given projection shape (Arbor). This arborization shape can be rectangular "[ ]"with a height and width (h×w), doughnut shaped "⊖" with the shape constrained by an inner and outer radius (r1, r2), or non-topographical "non-topo" where any pairs of presynaptic and postsynaptic neuronal units have a given probability of being connected. The initial connection strengths ($c_{ij}(0)$, can be set randomly with the range given by a minimum and maximum value (min, max). A negative value for $c_{ij}(0)$, indicates inhibitory connections. Connections marked with "intra" denote those within a visual sub-area and connections marked with "inter" denote those between visual sub-areas. Projections marked # can be value-dependent. As already mentioned, a connection type can be voltage-independent (VI), or voltage-dependent (VD). ϕ denotes the persistence of the connection. Non-zero values for η, $k_1$, and $k_2$ signify plastic connections.

Synaptic Plasticity—Value Independent Plasticity.

Synaptic strengths can be subject to modification according to a synaptic rule that depends on the phase and activities of the pre- and postsynaptic neuronal units. Plastic synaptic connections can be either value-independent (see EC$_{IN}$→DG, CA3,CA1; DG→CA3; CA3 →CA1; CA1EC$_{OUT}$ in FIG. 8B and Table 2) or value-dependent (see CA1→S, CA1M$_{HDG}$). Both of these rules are based on a modified BCM learning rule in which synaptic change ($\Delta c_{ij}$) is a function of the post- and pre-synaptic neuronal unit's activity and a sliding threshold (θ) as shown graphically in the insert next to FIG. 8B. Synapses between neuronal units with strongly correlated firing phases can be potentiated and synapses between neuronal units with weakly correlated phases are depressed; the magnitude of change is determined as well by pre- and postsynaptic activities.

Thus, value-independent synaptic changes in $c_{ij}$ can be given by:

$$\Delta c_{ij}(t+1) = \eta s_i(t) s_j(t) BCM(s_i)$$

where $s_i(t)$ and $s_j(t)$ are activities of post- and presynaptic units, respectively, and η is a fixed learning rate. The function BCM can be implemented as a piecewise linear function, taking post-synaptic activity as input, which is defined by a sliding threshold, θ, two inclinations ($k_1$, $k_2$) and a saturation parameter ρ(ρ=6 throughout):

$$BCM(s) = \begin{cases} -k_1 s; & s \leq \theta/2 \\ k_1(s-\theta); & \theta/2 < s \leq \theta \\ k_2 \tanh(\rho(s-\theta))/\rho; & \text{otherwise} \end{cases}$$

The threshold can be adjusted based on the post-synaptic activity:

$$\Delta\theta = 0.25(s^2 - \theta)$$

Value-independent plasticity can be subject to weight normalization to prevent unbounded potentiation:

$$c_{ij} = \frac{c_{ij}}{sqrt\left(\sum_{k=1}^{K} c_{kj}^2\right)};$$

where $c_{ij}$ is a particular connection, and K is the total number of connections onto neuronal unit j.

Synaptic Plasticity—Value Dependent Plasticity.

The rule for value-dependent plasticity can differ from the value-independent rule in that synaptic change and is governed by the pre-synaptic activity, post-synaptic activity, and temporal difference TD from the value systems (see above re Value System and Temporal Difference Learning). The synaptic change for value-dependent synaptic plasticity can be given by:

$$\Delta c_{ij}(t+1) = \eta s_i(t) s_j(t) TD(t);$$

where TD(t) is the temporal difference value at time t.

What is claimed is:

1. A brain-based device (BBD) for moving in a real-world environment, comprising:
   a) sensors for providing input data about the real-world environment;
   b) actuators for enabling the BBD to move about in the real-world environment; and
   c) a hybrid controller, responsive to the input data, for providing output data to control said actuators, said hybrid controller, responsive including
      i) a neural controller having a simulated nervous system exhibiting the morphology and function of a portion of the human brain, the neural controller configured to generate command output data to control said actuators; and ii) a non-neural controller for functioning based on a computational algorithmic network;

d) wherein said neural controller and said non-neural controller interact with each other to adapt the movement of the BBD in the real-world environment in response to changing environmental conditions sensed by said sensors e) said non-neural controller, in response to certain input data relating to given real-world environment condition, operable to override the command output data from said neural controller controlling said actuators.

2. A brain-based device (BBD) according to claim 1, wherein
a) said neural controller includes a neuronal group of neuronal elements, the neural group having activity in dependence on the input data;
b) said non-neural controller includes an action selection unit for controlling said actuators to move the BBD in a particular direction; and
c) wherein if the activity of said neuronal group exceeds a threshold activity in response to the input data, said neuronal group controls said action selection unit of said non-neural controller to adapt the movement of the BBD in the real-world environment.

3. A brain-based device (BBD) according to claim 2, wherein
a) the input data to said neuronal group represents a field of view of a movable object in the real-world environment; and
b) said action selection unit causes the BBD to move towards the movable object.

4. A brain-based device (BBD) according to claim 2, wherein
a) said neuronal group, in response to visual input data, produces first heading information about an object movable in the real-world environment;
b) said non-neural controller includes an obstacle avoidance algorithm for providing second heading information about an obstacle in the real-world environment; and
c) said obstacle avoidance algorithm uses said first heading information to generate control information to determine a direction of movement of the BBD and avoid the obstacle, said actuators being responsive to the control information.

5. A brain-based device (BBD) according to claim 4, wherein
a) said sensors have a visual field that provides visual information about the real-world environment;
b) said neural controller tracks a moving ball in the visual field of said sensors to produce a value that corresponds to the azimuth and heading of the moving ball in the visual field; and
c) wherein said obstacle avoidance algorithm of said non-neural controller, in response to the first heading information of the ball and the second heading information of the obstacle, generates control data for said actuators to cause the BBD to chase the ball.

6. A brain-based device (BBD) according to claim 1, wherein
a) said neural controller includes a plurality of neuronal groups of neuronal elements;
b) wherein said non-neural controller can create temporary synaptic connections between said neuronal groups of said neural controller; and c) wherein said neuronal groups having said temporary synaptic connections and in response to movement of the BBD in the real-world environment, undergoes neural activity.

7. A brain-based device (BBD) according to claim 6, wherein
a) said non-neural controller includes an action selection unit for controlling said actuators to move the BBD in a particular direction;
b) said action selection unit of said non-neuronal controller, in response to an object moving in the real-world environment, determines that the object should be chased;
c) said neural controller includes a first neuronal group of neuronal elements having activity associated with movement of an object in the real-world environment and a second neuronal group of neuronal elements having activity associated with motor movement of the BBD; and
d) said action selection unit, in response to the determination to chase the object, creates temporary synaptic connections from said first neuronal group to said second neuronal group to move the BBD and chase the object.

8. A brain-based device (BBD) according to claim 1, wherein
said neural controller, in response to the input data, generates the output data being a command to said actuators to move the BBD.

9. A brain-based device (BBD) according to claim 8, wherein
a) said sensors include a movable sensor for detecting a visual field of the real-world environment;
b) said neural controller includes a first neuronal group of neuronal elements for controlling movement of said movable sensor for sensing the visual field, and a second neuronal group of neuronal elements for controlling the movement of the BBD;
c) said non-neuronal controller includes an obstacle avoidance algorithm for providing information about the heading of an obstacle in the real-world environment; and
d) wherein said obstacle avoidance algorithm of said non-neuronal controller, in response to detection of the obstacle, inhibits said first neuronal group and said second neuronal group and produces a motor command signal to control movement of the BBD to avoid the obstacle.

10. A brain-based device (BBD) according to claim 1, wherein said neuronal controller and said non-neural controller receive and respond to the same input data.

11. A brain-based device (BBD) according to claim 10, wherein
a) said sensors include a laser to provide an input stream of laser range data to said hybrid controller;
b) said simulated nervous system of said neural controller further includes a neural group of neuronal elements exhibiting the morphology and function of the cortical area of the human brain, the neural group of neuronal elements configured to directly receive an input stream of laser range data; and
c) said non-neuronal controller includes a localization computational algorithm to determine the location of the BBD in the real-world environment in response to said input stream of laser range data.

12. A brain-based device (BBD) according to claim 1, wherein said neural controller and said non-neural controller interact with one another to process a circular flow of information to and from said neural controller and said non-neural controller.

13. A brain-based device (BBD) according to claim 12, wherein
   a) said non-neural controller includes a localization computational algorithm to provide information about the location of the BBD in the real-world environment;
   b) said simulated nervous system of said neural controller further includes a group of neuronal elements exhibiting the morphology and function of the hippocampus of the human brain; and
   c) wherein the activity of the localization computational algorithm and the neuronal group of neuronal elements provide, through the circular flow of information, updated information for use by the localization computational algorithm for determining the location of the BBD in the real-world environment.

14. A brain-based device (BBD) according to claim 1, wherein said non-neural controller modulates neural activity in said neural controller.

15. A brain-based device (BBD) according to claim 14, wherein
   a) said neural controller includes a plurality of neuronal groups of neuronal elements which are synaptically connectable;
   b) said non-neural controller includes an action selection algorithmic module for controlling the action of the BBD; and
   c) wherein said action selection algorithmic module increases activity between one neuronal group and another neuronal group while allowing for cross-inhibition of activity between all other neuronal groups.

* * * * *